US009003276B2

(12) United States Patent
Harrop et al.

(10) Patent No.: US 9,003,276 B2
(45) Date of Patent: Apr. 7, 2015

(54) DOCUMENT ASSEMBLY SYSTEM

(75) Inventors: Jason Brett Harrop, Victoria (AU); Justin Mark Lipton, South Caulfield (AU); Michael Llewellyn Robert Smith, Ivanhoe (AU)

(73) Assignee: Speedlegal Holdings Inc., San Francisco, CA (US)

( * ) Notice: Subject to any disclaimer, the term of this patent is extended or adjusted under 35 U.S.C. 154(b) by 1057 days.

(21) Appl. No.: 13/008,516

(22) Filed: Jan. 18, 2011

(65) Prior Publication Data

US 2011/0161801 A1 Jun. 30, 2011

Related U.S. Application Data

(62) Division of application No. 10/506,357, filed as application No. PCT/AU03/00253 on Feb. 28, 2003, now Pat. No. 7,895,516.

(30) Foreign Application Priority Data

Mar. 1, 2002 (AU) ........................................... 0849

(51) Int. Cl.

| | |
|---|---|
| ***G06F 3/00*** | (2006.01) |
| ***G06F 17/22*** | (2006.01) |
| ***G06F 17/21*** | (2006.01) |
| ***G06F 17/24*** | (2006.01) |
| ***G06F 17/30*** | (2006.01) |

(52) U.S. Cl.

CPC .......... *G06F 17/2229* (2013.01); *G06F 17/211* (2013.01); *G06F 17/2247* (2013.01); *G06F 17/243* (2013.01); *G06F 17/248* (2013.01); *G06F 17/30896* (2013.01)

(58) Field of Classification Search

USPC ................................. 715/234, 243, 254, 255

See application file for complete search history.

(56) References Cited

U.S. PATENT DOCUMENTS

| | | | |
|---|---|---|---|
| 6,006,242 | A | 12/1999 | Poole et al. |
| 7,028,028 | B1 | 4/2006 | Balmin et al. |
| 2002/0002566 | A1 | 1/2002 | Gajraj |
| 2002/0078094 | A1 | 6/2002 | Krishnaprasad et al. |
| 2002/0178290 | A1 | 11/2002 | Coulthard et al. |
| 2003/0033193 | A1 | 2/2003 | Holloway et al. |
| 2003/0097283 | A1 | 5/2003 | Kimura et al. |
| 2005/0026603 | A9 | 2/2005 | Rajaram |

FOREIGN PATENT DOCUMENTS

| | | |
|---|---|---|
| GB | 2383662 | 7/2003 |

OTHER PUBLICATIONS

Kane et al., "Consistently Updating XML Documents Using Incrememtal Constraint Check Queries," 2002, ACM, pp. 1-8.

*Primary Examiner* — Kyle Stork

(74) *Attorney, Agent, or Firm* — Blakely Sokoloff Taylor & Zafman

(57) ABSTRACT

A document assembly or document automation system includes an assembler for generating an instance document on the basis of a source document and one or more logic source documents referenced by the source document. The source document and logic source documents are XML documents including at least one XML processing instruction. The source document and logic source documents are valid with respect to XML schema. The system generates an instance document in HTML, PDF or RTF format by resolving variables in the source document and/or logic sources using one or more data sources. This may involve performing one or more interview rounds with a user of the system, access to a database, and/or evaluation of a function defined in one of the documents. The system includes an editor for creating and maintaining source documents and logic source documents while maintaining their validity with respect to the appropriate XML schema.

22 Claims, 15 Drawing Sheets

Figure 11
File Edit View Search Go Bookmarks Tasks Help Debug QA
Back
Forward
Reload
Stop
http://192.168.1.
Search
Print
Letter template
Setup
How much leave is Mr Citizen entitled to?
Award entitlements
BEST FOR EMPLOYER
By negotiation with SpeedLegal
NEXT
Document: Done (1.885 secs)

DOCUMENT ASSEMBLY SYSTEM

CROSS-REFERENCE TO RELATED APPLICATION

The present patent application is a Divisional application claiming the benefit of application Ser. No. 10/506,357, filed Aug. 31, 2004, which claims the benefit of International Application PCT/AU03/00253, filed Feb. 28, 2003.

FIELD OF THE INVENTION

The present invention relates to document assembly or document automation, and in particular to a document assembly system, and methods executed by components of the system.

BACKGROUND

Document assembly refers to the generation of an instance document from one or more source documents. In general, a source document is a generic template document, and additional information specific to the relevant circumstances is required to generate an instance document from one or more source documents. This additional information can originate from a user and/or some other data source. Document assembly software has been developed for generating documents that typically contain large amounts of common text or data with a smaller amount of varying detail text or data. Document assembly software is useful because, where a suitable source document exists, it enables instance documents to be produced more efficiently than may otherwise be the case using a standard word processor. A form letter is perhaps the simplest and most familiar example of a source document, and can be used to generate instance letters for a number of recipients. An instance letter is typically generated from a single source document and addressee information, such as the addressee's first and last names, title, and address. More complex instance documents, such as legal or financial documents, can be generated from one or more source documents, based on information specific to the parties involved and the circumstances of their relationships.

A source document is represented in a document assembly system in some data format. Common data formats (only some of which are commonly used for source documents for a document assembly system) include plain text. Microsoft's proprietary Microsoft Word "doc" format, the rich text format (RTF), portable document format (PDF), and hypertext markup language (HTML). A data format which is now being used for a wide variety of applications is extensible markup language (XML), as described at http://www.w3 org/XML. An XML document combines the text of a document with tags that markup that text into logical elements. As a data format for storing documents generally, XML has a number of advantages over other data formats. In particular, XML can be used to markup text in a way that tags it with its meaning or purpose, and applications can manipulate the text on the basis of these tags. Tools for parsing and manipulating XML data are available from a variety of vendors.

XML allows a document grammar to be defined which an XML document must match if it is to be said to be valid with respect to that grammar. If a document is valid, then systems that can handle documents matching that grammar can manipulate those documents taking advantage of the grammar. Such a grammar is often contained within a "document type definition" (DTD) or "XML schema". There are many different grammars for XML documents that are designed to meet specific needs. For example, the DocBook document type definition, documented at http://www.oasis-open.org/docbook/xml/, was designed to meet very general documentation requirements.

A document assembly system preferably performs a number of basic functions. First, it determines, on the basis of data provided to it, which parts of a source document to include in or exclude from a resulting instance document. For example, a paragraph, sentence or phrase might only be included in a legal contract if there is a guarantor. Second, the system can also include in the instance document text which is not present in the source document, for example, a date, an address, or where a user of the system enters a yearly rental, the amount calculated to be payable per calendar month. In order to be able to provide these two basic functions, a document assembly system stores (i) information as to which parts of the source document may be included or excluded from the instance document, and (ii) information as to the locations in the document in which additional text may be inserted.

It is also desirable to be able to repeat a passage of text a specified number of times, but with different data inserted at certain points within the passage in each repetition. This requires the ability to identify the passage to be repeated, the number of times to repeat it, and the data to be inserted into each repetition.

Existing document assembly products that work with source documents which are not XML based often encode the information described above directly in the source document. This is possible with XML source documents as well. The information could be stored as additional elements or attributes in the XML document itself. However, a serious difficulty with this approach is that the document will not be valid unless the grammar is altered to allow the inclusion of that information.

In an alternative approach, taught in U.S. Pat. No. 6,006,242 (Poole, et al. "Apparatus and method for dynamically creating a document"), entity references are embedded in a document instance, and a dedicated entity resolver is used during the document assembly process to replace the entity references with text particular to the instance document. One problem with this approach is that the source document will not validate against the original grammar unless the validating parser being used uses that dedicated entity resolver.

Because in each of these approaches the document no longer validates against the original grammar using a validating XML parser, the ability to manipulate the document with 3$^{rd}$ party XML-aware applications is significantly curtailed.

It is desired to provide a document assembly method and system, a method for generating a source document for a document assembly system, a source document for a document assembly system, a logic source for a document assembly system, and a grammar for a logic source for a document assembly system that ameliorate one or more of the above difficulties, or at least provide a useful alternative.

SUMMARY OF THE INVENTION

In accordance with the present invention there is provided a document generation system, including:

(i) a generation component for generating an XML source document by associating an initial XML document with one or more logic sources, said initial XML document and said XML source document both being valid with respect to the same predetermined DTD or schema; and (ii) an insertion component for inserting in said XML source document one or more assembly instructions for determining content of an instance document.

The present invention also provides a method for generating an XML source document for a document assembly system, including:

(i) generating said XML source document by associating an initial XML document with one or more logic sources, said initial XML document and said XML source document both being valid with respect to the same predetermined DTD or schema; and (ii) inserting in said XML source document one or more assembly instructions for determining content of an instance document.

The present invention also provides a document assembly method, including:

accessing an XML source document including one or more assembly instructions and one or more logic sources associated with said XML source document; and generating an instance document on the basis of said XML source document and said logic sources, wherein said XML source document is valid with respect to a predetermined DTD or schema.

The present invention also provides a document assembly system, including a processing engine for generating an instance document from at least one XML source document and one or more logic sources associated with said at least one XML source document, wherein said at least one XML source document is valid with respect to a predetermined DTD or schema.

The present invention also provides a document assembly system, including an editor for generating an XML source document by associating an initial XML document with logic for use in generating an instance document from said XML source document, said initial XML document and said XML source document being valid with respect to the same predetermined DTD or schema.

The present invention also provides an XML source document for a document assembly system, said XML source document including one or more assembly instructions for determining content of an instance document, said XML source document being valid, with respect to a predetermined DTD or schema.

The present invention also provides a logic source for a document assembly system, said logic source including one or more logic elements for determining content of an instance document from an XML source document associated with said logic source, said XML source document being valid with respect to a predetermined DTD or schema.

BRIEF DESCRIPTION OF THE DRAWINGS

Preferred embodiments of the present invention are hereinafter described, by way of example only, with reference to the accompanying drawings, wherein.

DETAILED DESCRIPTION OF THE PREFERRED EMBODIMENT

In this specification, a reference to a document includes a reference to entries in a file system, database or other library, which can be taken together to represent the document. A reference to a document includes a reference to a collection of documents.

Figure 1:
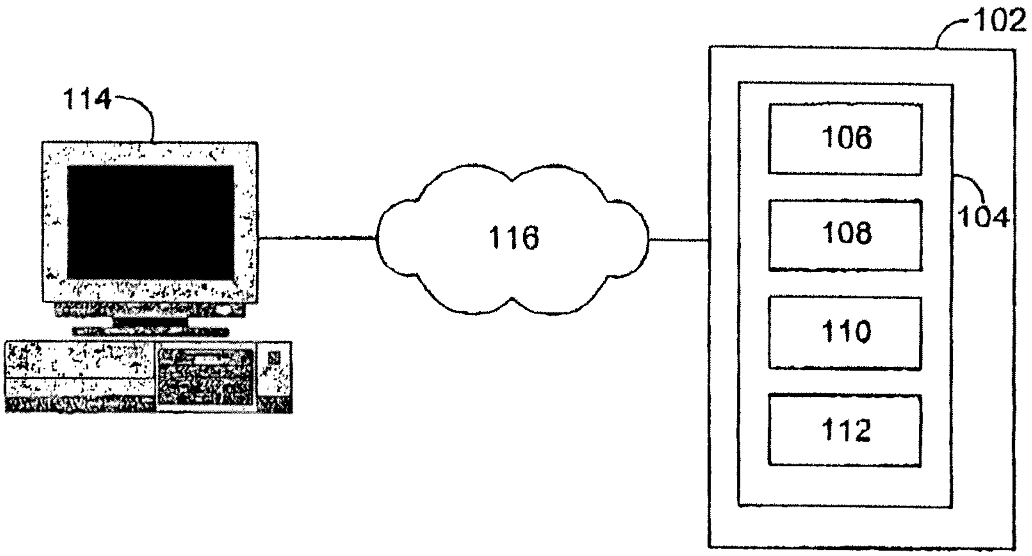
FIG. 1 is a block diagram of a preferred embodiment of a document assembly system connected to a remote computer system via a communications network.
Figure 2:
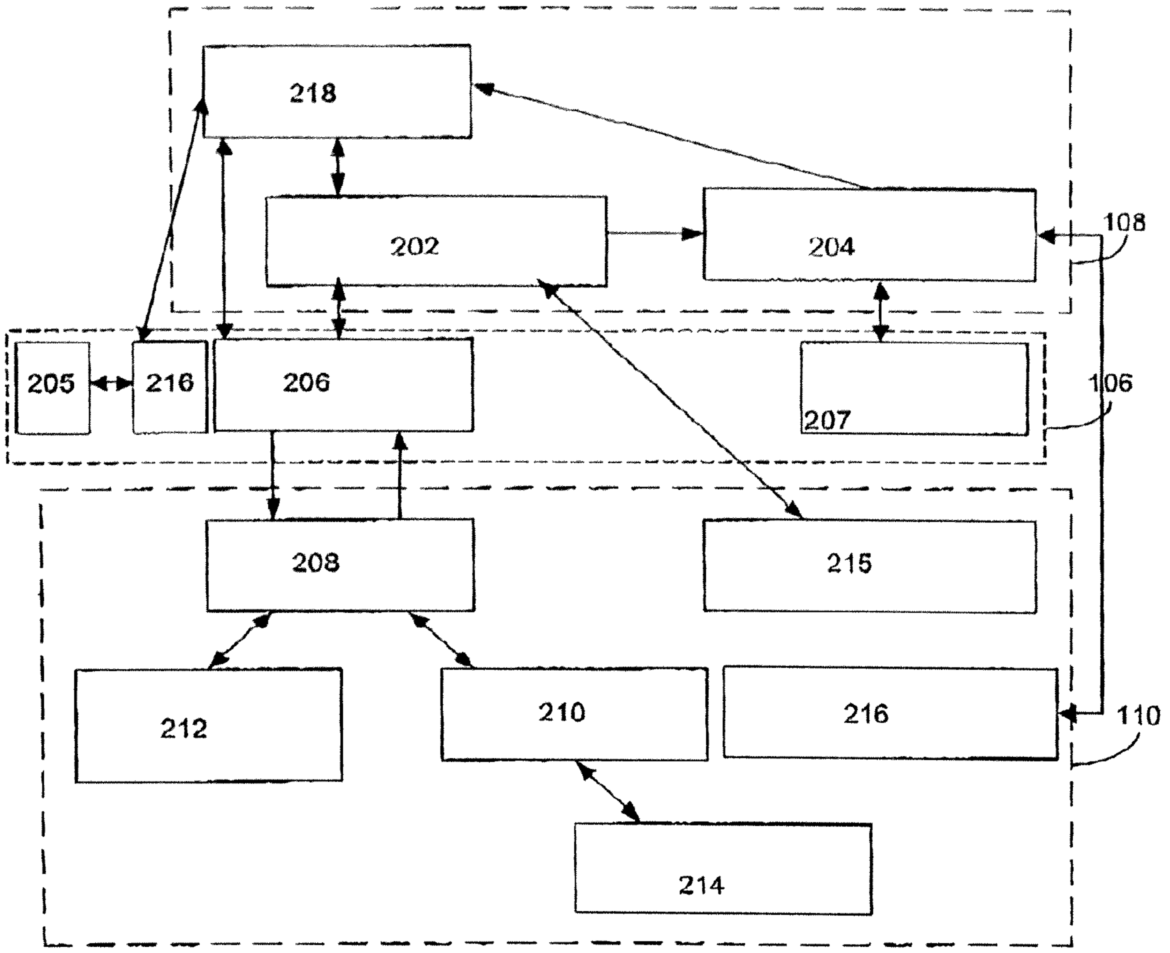
FIG. 2 is a block diagram of document assembly modules, standard processing modules, and document assembly data files of the system.

As shown in FIG. 1, a document assembly system includes a server 102 having a number of modules 106 to 112. The document assembly system can be remotely accessed by a user of a computer system 114 via a communications network 116, such as a local area network or a wide area network such as the Internet. The modules 106 to 112 of the document assembly system include standard processing modules 106, document assembly modules 108, and document assembly data files 110. The system also includes an editor 112 for creating and editing the data files 110. As shown in FIG. 2, the standard processing modules 106 include a web server (such as Apache™) 205, an HTTPD servlet container 216, an XML parser 206, and an XSLT engine 207.

The document assembly modules 108 include a Java controller servlet 218, a processing engine 202 and a rendering engine 204. The Java controller servlet 218 was created using the Java Development Kit available from Sun Microsystems®, and provides an interface between the other document assembly modules and the servlet container 216. A user of the computer system 114 can access the document assembly system using a web browser application executing on the computer 114. HTTP requests generated by the browser are sent over the network 116 and are received by the HTTPD servlet container 216. Access to the document assembly modules 108 is provided via the Java Servlet 218, which in turn invokes the processing engine 202 to generate an instance document on the basis of the document assembly data files 110. The instance document is rendered by the rendering engine 204 to generate a rendered document which is sent to the user's web browser via the Java controller Servlet 218.

The data files 110 include source documents 208, logic sources 210, document grammars 212, and logic grammars 214. The data files 110 may also include stored response data 215. In the described embodiment, the server 102 is a standard computer server such as a Sun Fire® 15K server from Sun Microsystems® and executing a Solaris® operating system, and the processing modules 106, 108, and 112 of the document assembly system are implemented as software modules stored on hard disk storage 104 of the server 102. The data sources 110 are data files also stared on the hard disk storage 104. However, it will be apparent that the modules of the document assembly system can alternatively be distributed over a variety of locations, and that at least part of the modules 106, 108, and 112 can be alternatively implemented as dedicated hardware components such as application specific integrated circuits (ASICs).

The document assembly system generates instance documents from one or more generic source documents 208 on the basis of information provided by one or more data sources. The data source is typically a user of the system, but other data sources can be used in addition to, or instead of, a user. In the case when a user is a data source, this information in provided in the form of responses to questions generated by the system on the basis of information contained in logic sources 210. The document assembly system uses XML as the data format for representing source documents 208 and logic sources 210. In addition to elements used for structuring data, XML defines a comment and a processing instruction (PI). A processing instruction is not part of a document's usual character data, but is instead passed through to an application. Thus a processing instruction can be included in a document without affecting its validity. The form of a PI can be represented as follows:

PI::='<?' PITarget (S(Char*-(Char* '?>' Char*)))? '?>'

The information in the processing instruction is not itself checked by a parser at all (apart from ensuring it begins with a string PITarget, used to identify the target application for the PI). Moreover, processing instructions can be placed anywhere in an XML document. The document assembly system uses PIs to separate logic used to generate an instance document from the source document itself. A source document 208 includes references to external logic sources 210 that are required to resolve the logic contained in the source document 208 itself.

A source document 208 is a structured XML document, usually including one or more processing instructions, as described above. Some of these processing instructions include logic components that are used to determine the content of instance documents generated from the source document 208. The logic in a source document 208 is resolved using logic from one or more external logic sources 210. A logic source required by a source document 208 is identified by a reference (in the form of a universal resource indicator (URI)) in a processing instruction. The logic sources 210 are themselves structured XML documents that define questions, conditions, and reusable text objects. The processing engine 202 uses the XML parser 206 to read source documents 208 and logic sources 210. A logic source 210 can include one or more references to other logic source documents humans, the rendering engine 204 transforms the source XML document (as modified by the processing engine 202), omitting elements subject to an inclusion condition found to be false, and including responses to questions where appropriate into the desired instance format. Initially, the rendering engine 204 generates an HTML rendering of the instance document that includes controls for further processing of the document. Once an instance document has been finalised, the rendering engine 204 is used to generate a final rendering of the instance document, as described below.

It will be apparent mat in order to generate an instance document in the format requested by the user (other than XML), it is not necessary to first generate an instance document in XML that is valid with respect to the same grammar as the source XML document. For desired instance formats other than XML (XML that is valid against the same grammar as the source XML document), the source XML document (as modified by the processing engine 202) is transformed by the rendering engine 204 into the desired instance format via several intermediate XML formats. During the course of those transformations, the processing instructions are replaced as appropriate with the information obtained during the interview process.

In an alternative embodiment, the processing engine 202 generates an instance XML document (using the same grammar as the source document or a similar one) for the rendering engine 204. In yet a further alternative embodiment, the generation of that instance XML document is an early step performed by the rendering engine 204 in the course of generating the instance document in the format desired by the user.

Figure 3:
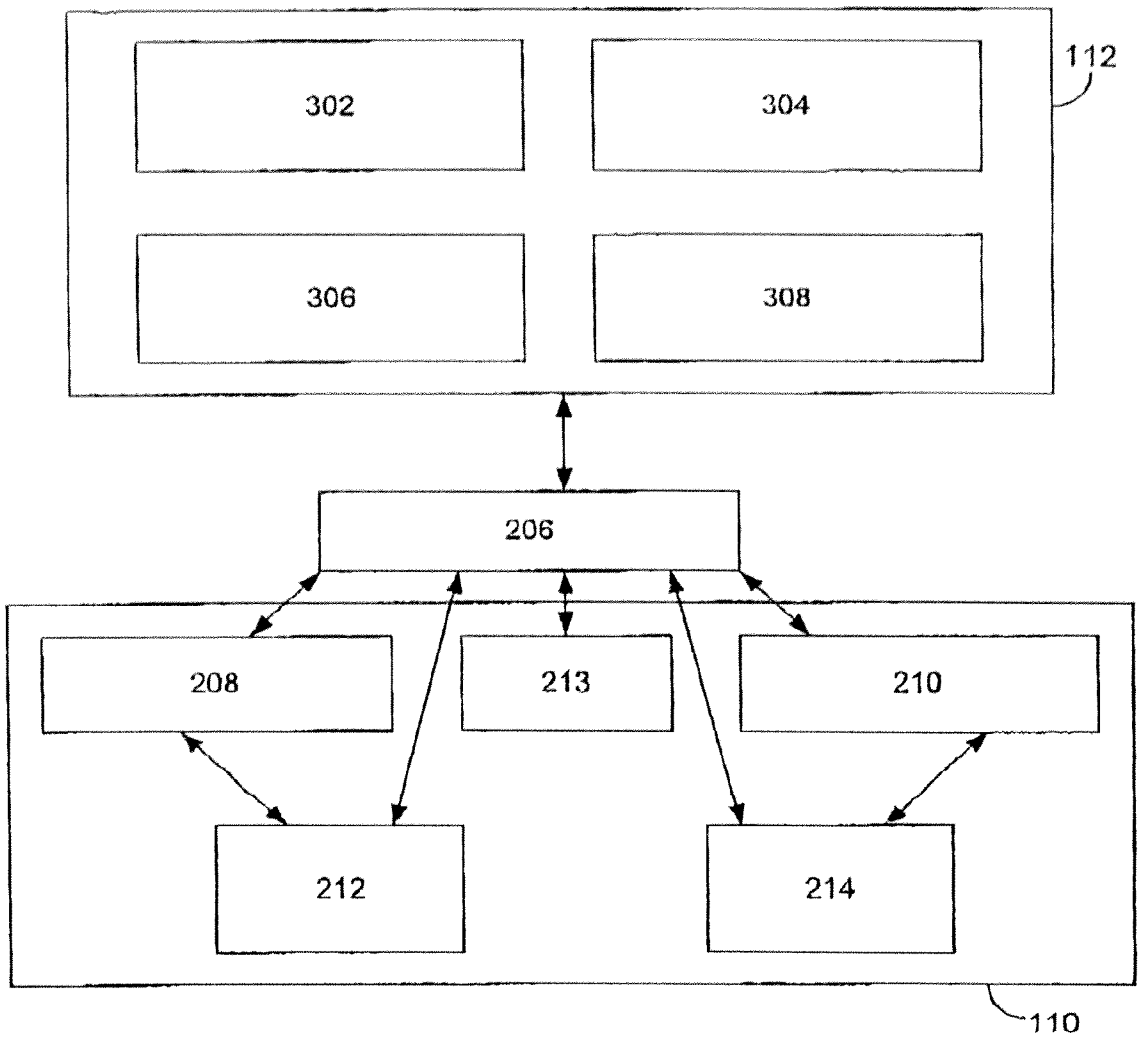
FIG. 3 is a block diagram showing components of an editor of the system.

Source documents 208 and logic sources 210 are created and maintained using the editor 112, as shown in FIG. 3. In the described embodiment, the editor 112 is shown as being stored locally on the server 102. However, it will be apparent that the editor 112 can alternatively be stored and executed on a remotely located computer system and used to edit document assembly files at that location, providing that the resulting files are accessible by the parser 206 and processing engine 202 of the system. The editor 112 includes a user interface module 302, an XML editor module 304, a validation module 210. The source documents 208 are described by document grammars 212, against which the source documents 208 can be validated. Similarly, the logic sources 210 can be validated against logic grammars 214.

The processing engine 202 resolves logic associated with an XML source document 208. When a user of the system is used as a data source, the logic is resolved by performing one or more question and answer interview rounds that determine which components and text from the source documents 208, referenced logic sources 210 and user responses are included in the resulting instance document.

A logic source includes XML elements that are used to determine values for variables required by a source document or other logic source referring to that logic source. These variable values are usually determined from responses provided by a user of the system in response to questions defined in one or more logic sources 210 referenced by the source document, either directly or indirectly via a chain of references. The process of displaying questions to the user and receiving responses to those questions is referred to as an interview, and the data defining these questions and possible responses to them is referred to as interview data. A given set of responses to a set of questions can be stored as stored response data 215 on the hard disk 104 of the document assembly system. The user's responses are used to assign values to variables, such as setting Boolean variables to a value of true or false for determining whether an associated portion of text is to be included in a generated instance document. These variables values are referred to as assembly data.

During the course of resolving all the logic necessary for the rendering engine 204 to be able to render an instance document, the processing engine 202 may modify a document object model (DOM) representation of the source XML document 208, for example, by physically including XML fragments to which the source XML document 208 refers.

After the processing engine 202 has resolved all the logic necessary for the rendering engine 204 to be able to render the instance document in a form suitable for viewing by 306, and a logic module 308. The user interface 302 and XML editor 304 modules allow a user of the document assembly system to add, modify, or delete XML elements, attributes, comments, processing instructions, and text. The XML editor module 304 provides standard XML editor functions plus the ability to add and manipulate condition references, reusable text, user text, notes, and meta-information processing instructions around and within document components. If a processing instruction having some other purpose is added to the system, the XML editor module 304 is altered to add and manipulate that sort of processing instruction as well.

The validation module 306 provides standard XML document validation, as well as logic source validation, and validation of interactions between source XML documents 208 and logic sources 210. The logic module 308 allows the user to define and manipulate questions, conditions and reusable text. It also allows the user to define parameter values that are used to determine default answer to questions, as described below. The editor 112 allows a user to define and manipulate logic within the logic sources 210, manipulate XML documents 208, and add logic references to a logic source 210 within an XML document 208. The editor 112 parses XML elements using the XML parser 206. The editor 112 uses the document grammars 212 and logic grammars 214 to determine which elements can be added and deleted, and how they can be manipulated. Grammars are also used as a basis for determining what types of logic can be added. For example, reusable text can only be added to elements that are allowed to contain text.

Figure 4:
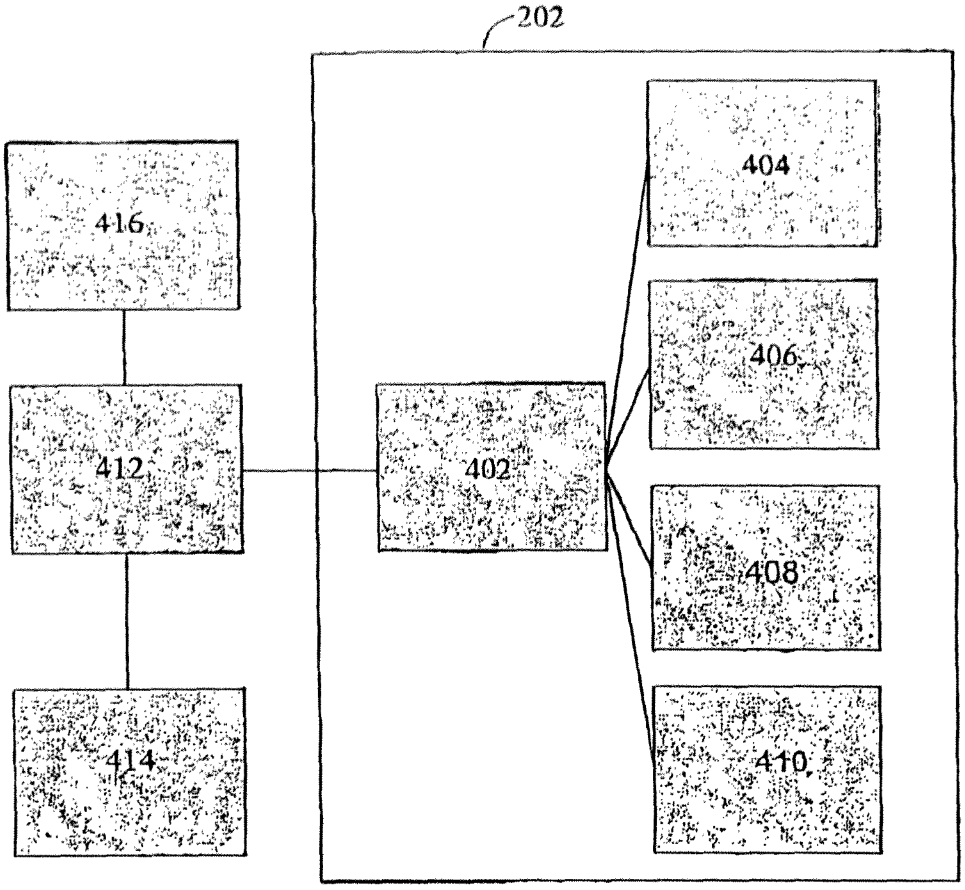
FIG. 4 is a block diagram of a processing engine of the system.

The processing engine 202 is coded in the object-oriented programming language Java. The Java language specification defines the notion of a package. As shown in FIG. 4, the processing engine 202 includes an Evaluator 402, an evaluable node package 404, a parties package 406, an interview items package 408, and a logic sources package 410.

The evaluable node package 404 contains classes that represent a Condition and the various elements that are allowed within a Condition (e.g., And, Or, Not, Test and UseCondition). Each of these implement an interface called EvaluableNode. That interface defines an evaluate method that can be invoked in order to determine whether the value of the evaluable node is true or false.

The parties package 406 contains a class that represents a Party "known" to the source document, a Parties class that represents all known parties, and a class that represents a PartyDetail.

The interview items package 408 contains classes that represent the questions which the evaluator module 402 has encountered, and any responses that may have been provided or, for non-"key" questions, generated automatically. These include MultipleChoiceQuestions referred to in a Test, UserTextQuestions, and interview items encountered in an ArrayRowIterator.

The logic sources package 410 represents each logic source used directly or indirectly by the source document, and their contents, so that when a reference to a piece of logic is encountered, the logic can be retrieved efficiently.

The evaluator module 402 is the collection of classes that orchestrate the evaluation of the source document. It controls the evaluation processing, represents the state of the evaluation and calls the packages described above as necessary.

The rendering engine 204 includes an XSLT module which is used for transforming XML documents, a collection of XSL transformations, and several Xalan extensions which are used to manipulate objects referenced by the processing engine 202's evaluator module. XSLT and Xalan are available and documented at http://xml.apache.org/xalan-j/.

The processing engine 202 begins processing an input XML document 208 when its invocation API is called by an invoking process 412. In the preferred embodiment, the invoking process 412 is the Java controller servlet 218 which invokes the processing engine 202 in response to a request from the user's web browser passed to it from the HTTPD servlet container 216. However, the processing engine 202 can alternatively respond to requests from other applications or a Web service.

The invoking process 412 asks the evaluator module 402 to evaluate the source document. While there are interview items for which the evaluator module 402 currently needs a response, the evaluator module 402 returns those interview items to the invoking process 412. It is the responsibility of the invoking process 412 to obtain a response for each of those interview items via some InterviewItem Resolution Mechanism 414. In the preferred embodiment, the Interview Item Resolution Mechanism usually renders those interview items as inputs on an HTML form sent to the user's web browser, although in some cases it resolves the interview item in some other way, for example via a query to a database, or by invoking a web service. In such cases, an Other Sources module 416 provides an interface to data sources such as databases, file systems, web services, directory services, and so on. The invoking process 412 then passes the interview items, together with their responses, back to the evaluator module 402.

Figure 5:
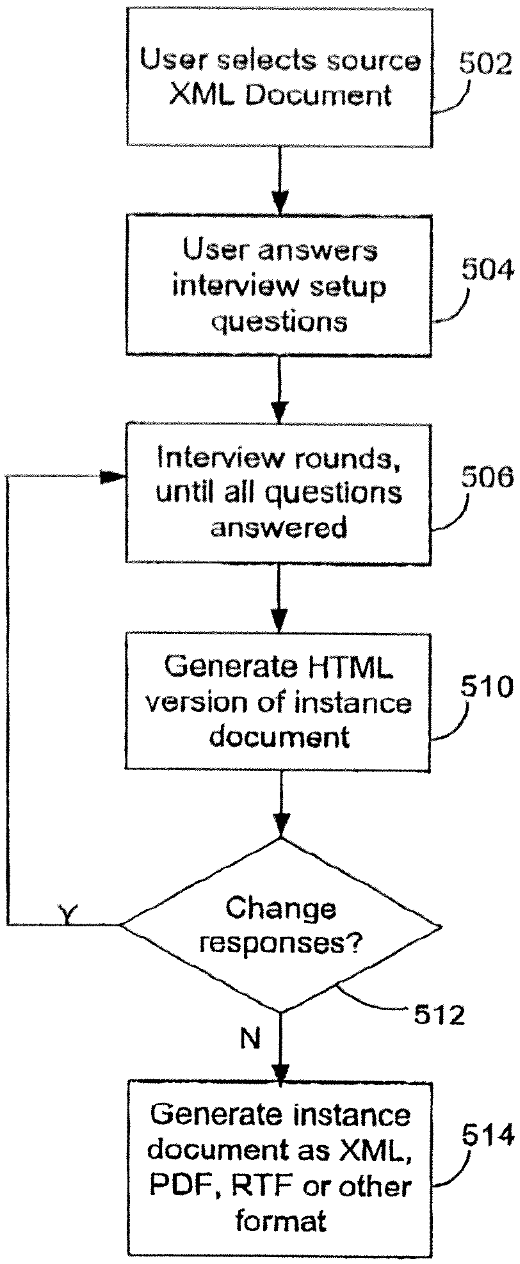
FIG. 5 is a flow diagram of a document assembly process used by the system.

FIG. 5 shows the steps followed when creating an instance document from a source XML document using a web browser executing on the user's computer 114. At step 502, the user selects a suitable source XML document from the repository of documents 208 stored on the document assembly system. At step 504, the user answers setup questions for one or more subsequent question or interview rounds. This includes specifying whether the user wants to be asked all questions during subsequent interviews, or just the "key" questions, in which case the system executes a scoring procedure, discussed below, to answer the non-"key" questions with the response having the highest score. If there is more than one Party used in the source XML document, then the user can specify which of the parties the user wishes to favour. This is used during subsequent interview rounds to select default responses that suit the selected party, and is also used by the scoring procedure that the system uses to answer questions itself. At step 506, successive rounds of interview questions are presented to the user until all the questions that need to be answered in order for the system to generate an instance document have been answered. The system uses multiple rounds of interviews in order to limit the number of questions asked to those necessary for a particular situation. In some documents, e.g., legal documents, it may not be possible to determine whether a particular question needs to be asked until answers have been provided for several other questions. The system therefore asks the necessary questions in a series of interview rounds, with the questions for a particular interview round determined from answers provided in one or more previous rounds.

As described above, the interview rounds are used to determine values for variables used by the source document and/or referenced logic sources, and these variables determine content of the resulting instance document. In the general case, where some or all variables are resolved from data sources other than a user, the variables are resolved at step 506, as described below, until the system is able to generate an instance document.

Variables that can be resolved without user input are resolved by the processing engine 202 from other data sources. The processing engine 202 provides the questions to which it requires responses to the Java controller servlet 218. It is the responsibility of that servlet 218 to return the responses to the processing engine 202. Where the questions are put to a user via their web browser, the controller servlet 218 can put all the questions to the user in a single HTML form, or it can put the questions to the user one at a time, or it can group them by topic, asking the questions in a single topic in a given form.

Figure 6:
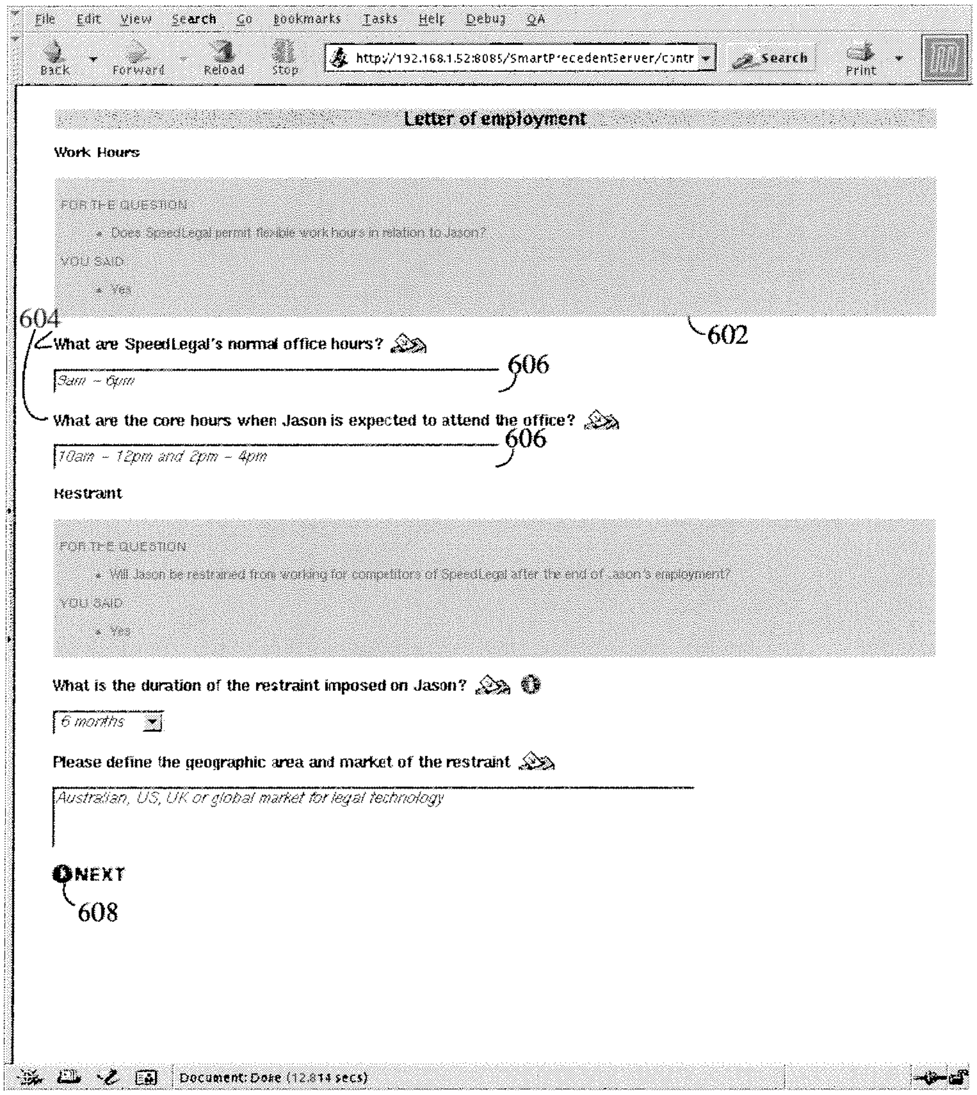
FIG. 6 is a screenshot of an interview screen displayed by a web browser during the document assembly process.

For example, FIG. 6 is a screenshot of a web browser display during an interview round for generating an instance document that is a letter of employment for a prospective employee. The display includes two questions for the user. The first is related to the employee's expected work hours. A shaded area 602 displays a question presented to the user in a previous interview round, together with the user's response. The question asked was whether the employer permits flexible working hours in relation to the employee. Because the answer previously provided was in the affirmative, subsequent questions 604 are displayed to the user in order to determine the nature of this flexibility. In this example, the questions are to determine the employer's normal office hours and the core working hours in which the employee is expected to be present. The user enters the appropriate answers in text boxes 606 displayed under each question 604.

Figure 7:
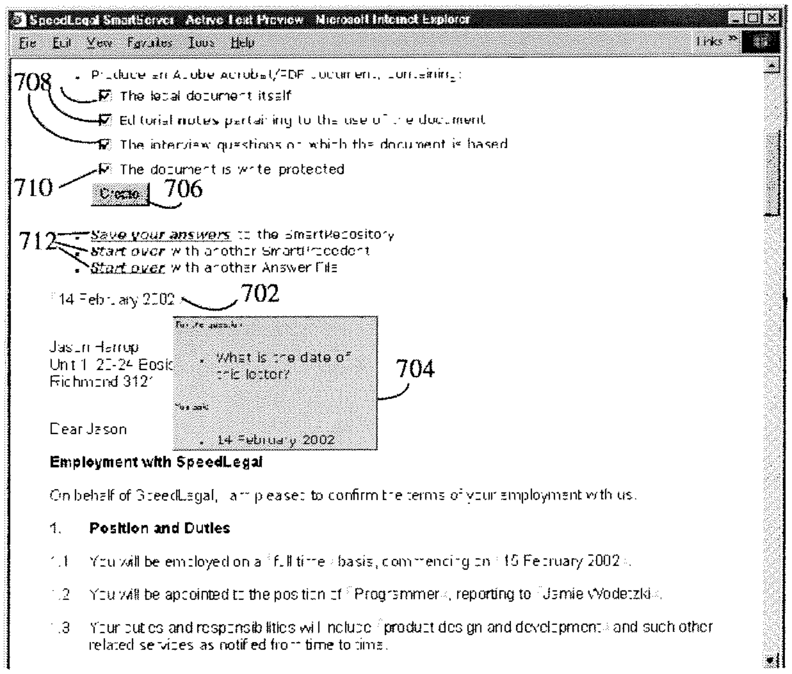
FIG. 7 is a screenshot of a web browser displaying an instance document in HTML format generated by the system.

In response to the user selecting a button 608 labelled "next", the processing engine 202 determines, at step 506, whether there are further questions. If there are no further questions, the rendering engine 204 generates at step 510 an instance document in HTML format on the basis of responses provided by the user, and the instance document is then displayed by the web browser, as shown in FIG. 7.

The parts of the text that are dependent on answers provided by the user are provided as hypertext anchors 702, allowing the user to view the questions and responses that resulted in the insertion of that text in a popup window 704 by moving their mouse over the text. If, at step 512, the user selects the hypertext anchor 702, the processing engine 202 generates a new interview round including the relevant question, allowing the user to provide a different response to that question. Questions dependent on the new response are then presented to the user at step 506 until the processing engine 202 determines that all the necessary information has been provided. A new HTML rendering of the instance XML document is then generated at step 510 and displayed by the web browser.

When the user is satisfied with the instance document, one of a number of buttons included near the top of the HTML instance document can be selected to generate an output document. The button selected determines the format of the output format. For example, FIG. 7 shows a button 706 for creating an output document in the Adobe® portable document format (PDF). However, the document can alternatively generated in HTML (without controls), XML, or in rich text format (RTF). Check boxes 708 are also provided in order to allow the user to determine the content of the output document, whether it will contain the instance document text, editorial notes pertaining to the use of the document, and/or the interview questions and answers on which the document was based. A further check box 710 allows the user to select whether the output document will be write protected.

Controls 712 are also provided for storing responses on the system as stored response data 215 and for applying stored responses to the source document they came from, or to another source document that uses some of the same logic sources, and for processing groups of related documents.

It is useful to be able to store tire response data, so that if a user wishes to modify some of the answers they have given in an earlier session, they can start by applying the stored response data to the source document, rather than having to answer all the questions again themselves. When an answer file containing stored response data is loaded, the questions and answers are displayed to the user in an HTML form. After the user has modified the responses as appropriate, and submitted the form (by selecting a "next" button), those interview items are provided to the evaluator module 402. When, in the course of evaluating the source document to which those answers are being applied, an interview item is encountered, there will be no need to ask the Java controller servlet 218 for a response to that item, if the response has already been provided via the answer file mechanism.

In a similar way, the Java controller servlet 218 can invoke the processing engine 202, applying a collection of response data to the several source documents comprising a group of related documents, and then invoke the rendering engine 204 to display the resulting instance documents in the user's browser, or save them to disk. It will be apparent that whether each document is processed then rendered, or all documents are processed then all rendered, depends on the controller servlet implementation (i.e., how it invokes the processing engine 202 and the rendering engine 204).

Thus the document assembly system provides an efficient, yet flexible means to generate and modify instance documents for different circumstances. The source documents 208, document grammars 212, logic sources 210 and logic grammars 214 are typically created and maintained by an administrator of the system in accordance with the needs of the system's users. For example, a legal firm will create precedents for particular circumstances, e.g., contracts, as source documents 208, together with their associated logic sources 210 and grammars 212, 214. The creation and maintenance of these files 110 is performed using the editor 112. The actual assembly of these files 110 into instance documents is initiated by end-users of the system accessing the system using a web browser.

The document assembly system is described in more detail below with reference to examples of the data files 110 used by the system. An XML source document used by the document assembly system for generating instance letters is presented below in its entirety. Portions of this source document are then described in detail to illustrate various features of the document assembly system.

```
<?xml version="1.0" encoding="UTF-8"?>
<!DOCTYPE Letter SYSTEM "file:///home/speedlegal/dtd/xhtml-letter/dtd/xhtml-letter-
v2.dtd">
<Letter>
    <?SpeedLegal
        <LogicSources>
            <LogicSource ID="LogicSource_1" uri="/files/logic/LS1WD.lgc"/>
            <LogicSource ID="LogicSource_2" uri="/files/logic/LS2WD.lgc">
                <PartyMapping>
                    <PartyMap From="Contractor" To="Employee">
                        <PartyDetailMap From="Shortname" To="Firstname"/>
                        <PartyDetailMap From="Fullname" To="Firstname"/>
                    </PartyMap>
                </PartyMapping>
            </LogicSource>
```

-continued

```
            </LogicSources>
        ?>
        <?SpeedLegal
            <MetaInformation>
                <rdf:RDF xmlns:dc="http://purl.org/dc/elements/1.1/"
xmlns:rdf="http://www.w3.org/TR/WD-rdf-syntax-ns#">
                    <rdf:Description>
                        <Metadata>
                            <dc:Type Genesis="Original" Status="Unapproved"
Use="Precedent"/>
                            <dc:Title>Letter template</dc:Title>
                            <dc:Description>Template business letter</dc:Description>
                            <dc:Subject><Keyword>Letter</Keyword></dc:Subject>
                            <dc:Creator>
                                <Name>SpeedLegal</Name>
                                <Organisation>SpeedLegal</Organisation>
                                <md.ContactDetails>
                                    <md.Address>Level 4, 85 Queen Street, Melbourne,
Victoria</md.Address>
                                    <md.Phone>+61 3 9670 0141</md.Phone>
                                    <md.Email>info@speedlegal.com</md.Email>
                                    <md.Fax>+61 3 9670 0142</md.Fax>
                                </md.ContactDetails>
                            </dc:Creator>
                            <RevisionHistory>
        <Revision><dc:Contributor><Name>SpeedLegal</Name></Organisation>SpeedLegal
</Organisation><md.ContactDetails><md.Address>Level 4, 85 Queen Street,
Melbourne, Victoria</md.Address><md.Phone>+61 3 9670
0141</md.Phone><md.Email>info@speedlegal.com</md.Email><md.Fax>+61 3 9670
0142</md.Fax></md.ContactDetails></dc:Contributor><dc:Date>6/2/2002
13:49</dc:Date><What ChangeType="BrandNew">Letter creation</What></Revision>
                            </RevisionHistory>
                        </Metadata>
                    </rdf:Description>
                </rdf:RDF>
            </MetaInformation>
        ?>
        <LetterHead>
            <Date/>
            <Salutation/>
        <LetterHead>
        <LetterBody>
            <p>
                <?SpeedLegal
                    <Condition IDREF="PaidLeave" LogicSource="LogicSource_1"/>
                ?>
                <?SpeedLegal
                    <PartyReference IDREF="Employee" LogicSource="LogicSource_1"
Style="Pronoun" Type="PartyDetail_1"/>
                ?> shall be eligible for paid leave.</p>
            <p>
                <?SpeedLegal
                    <Notes>
                        <Note CompletionInstruction="false" ShowExternalUsers="false"
UserLevel="Non-Specialist">
                            <NoteTitle>Paid and Unpaid Leave</NoteTitle>
                            <NoteBody><p>All employees can request <b>unpaid</b>
leave</p><p>Only <b>Full-time</b> or <b>Part-time</b> employees who have
accrued leave can request <b>paid</b> leave.</p></NoteBody>
                        </Note>
                    </Notes>
                ?>
                <?SpeedLegal
                    <PartyReference IDREF="Employee" LogicSource="LogicSource_1"
Style="Firstname" Type="PartyDetail_0"/>
                ?> may request <?SpeedLegal <InsertReusablePhrase
IDREF="PaidOrUnpaidLeave" LogicSource="LogicSource_1"/>?> by filling in a request
form at least one month prior to the earliest date required.</p>
            <p>
                <?SpeedLegal <Condition IDREF="AmountOfLeave.negotiate"
LogicSource="LogicSource_1"/>?>The amount of leave is negotiated with the
employee.</p>
            <p>
                <?SpeedLegal <Condition IDREF="AmountOfLeave.award"
LogicSource="LogicSource_1"/>?>The amount of leave is determined according to the
relevant award.</p>
            <p>The employee has the following leave entitlements: <object>
                    <table>
                        <tbody>
```

-continued

```
                              <tr>
                                   <?SpeedLegal <ArrayRowIterator
repeat="NumberOfLeaveTypes"/>?>
                                   <td><?SpeedLegal <ArrayReference IDREF="LeaveType"/>?>
</td>
                                   <td><?SpeedLegal <ArrayReference
IDREF="LeaveAmount"/>?>
</td>
                              </tr>
                         </tbody>
                    </table>
               </object>
          </p>
          <?SpeedLegal
               <SmartModule uri="/home/jml/termination.sm">
                    <PartyMapping>
                         <PartyMap From="Contractor" To="Employee">
                              <PartyDetailMap From="Shortname" To="Firstname"/>
                              <PartyDetailMap From="Fullname" To="Firstname"/>
                         </PartyMap>
                    </PartyMapping>
               </SmartModule>
          ?>
     </LetterBody>
     <LetterTail>
          <Closing/>
          <Sender/>
     </LetterTail>
</Letter>
```

This source document includes several processing instructions (PIs) that begin with "<?SpeedLegal" and end with "?>". The data within the processing instruction, i.e., between these two strings, resembles one or more XML elements. This allows an application to receive the data and parse it as XML, with the various benefits which that entails. It will be apparent to the skilled addressee that this structure is in conflict with the XSLT 1.0 specification, which specifically prohibits an XSLT processor from constructing PI data in this form. In what follows, it is convenient to refer to the PI data as if it were an XML element.

Some of the PIs in the above source document include within them a LogicSource XML element whose purpose is to specify the location or locations, outside of the source XML document itself, where the system can find the material necessary to process other processing instructions encountered within the document, such as the Condition instruction in the above example. For example, a logic source is identified in the above example as follows:

```
<LogicSources>
<LogicSource ID="LogicSource_1" uri="/files/logic/LS1WD.lgc"/>
```

The LogicSource sub-element of the LogicSources element specifies a universal resource indicator (URI) at which the corresponding logic source can be found, and assigns an ID reference name to it. Many of the processing instructions throughout the example source document above contain an IDREF reference to one of the ID reference names of the listed logic sources, which is used to identify the URI of the corresponding logic source. Thus the first logic source referred to in the XML document is located at the URI "/files/logic/LS1WD.lgc" and is referred to at other places in the source document by the ID reference "LogicSource_1". This logic source is provided below.

```
<?xml version="1.0" encoding="UTF-8"?>
<!DOCTYPE LogicFile PUBLIC "-//SpeedLegal//SpeedLegal Logic for SmartEditor
1v0//EN" "/home/speedlegal/dtd/logic.dtd">
<LogicFile>
     <MetaInformation>
          <rdf:RDF>
               <rdf:Description>
                    <Metadata>
                         <dc:Type Genesis="Original" Status="Unapproved" Use="Precedent"/>
                         <dc:Title>[ ]</dc:Title>
                         <dc:Description>[ ]</dc:Description>
                         <dc:Subject>
                              <Keyword>[ ]</Keyword>
                         </dc:Subject>
                         <dc:Creator>
                              <Name>SpeedLegal</Name>
                              <Organisation>SpeedLegal</Organisation>
                              <md.ContactDetails>
                                   <md.Address>Level 4, 85 Queen Street, Melbourne,
Victoria</md.Address>
                                   <md.Phone>+61 3 9670 0141</md.Phone>
                                   <md.Email>info@speedlegal.com</md.Email>
                                   <md.Fax>+61 3 9670 0142</md.Fax>
```

-continued

```
                        </md.ContactDetails>
                    </dc:Creator>
                    <RevisionHistory>
                        <Revision>
                            <dc:Contributor>
                                <Name>SpeedLegal</Name>
                                <Organisation>SpeedLegal</Organisation>
                                <md.ContactDetails>
                                    <md.Address>Level 4, 85 Queen Street, Melbourne,
Victoria</md.Address>
                                    <md.Phone>+61 3 9670 0141</md.Phone>
                                    <md.Email>info@speedlegal.com</md.Email>
                                    <md.Fax>+61 3 9670 0142</md.Fax>
                                </md.ContactDetails>
                            </dc:Contributor>
                            <dc:Date>5/2/2002 11:4</dc:Date>
                            <What ChangeType="BrandNew"> metadata</What>
                        </Revision>
                    </RevisionHistory>
                </Metadata>
            </rdf:Description>
        </rdf:RDF>
    </MetaInformation>
    <PartiesSetup>
        <Party Assessable="true" ID="Employee">
            <DisplayName>Employee</DisplayName>
            <Role>The person to be offered a position under this letter.</Role>
            <PartyDetails>
                <PartyDetail ID="PartyDetail_0" Name="Firstname">
                    <Value Gender="Unspecified" Number="Unspecified">
                        <InsertUserText IDREF="EmployeeFirstname"/>
                    </Value>
                </PartyDetail>
                <PartyDetail ID="PartyDetail_1" Name="Pronoun">
                    <Value Gender="Unspecified" Number="Singular">He</Value>
                    <Value Gender="Female" Number="Singular">She</Value>
                    <Value Gender="Unspecified" Number="Plural">They</Value>
                </PartyDetail>
            </PartyDetails>
        </Party>
        <Party Assessable="true" ID="Employer">
            <DisplayName>Employer</DisplayName>
            <Role>The person who will offer to engage the employee under this
letter.</Role>
            <PartyDetails>
                <PartyDetail ID="PartyDetail_2" Name="Name">
                    <Value Gender="Unspecified"
Number="Unspecified">SpeedLegal</Value>
                </PartyDetail>
            </PartyDetails>
        </Party>
    </PartiesSetup>
    <LogicSources/>
    <LogicSetup>
        <UserTextQuestion Columns="20" ID="LetterSubject" Rows="1" Type="Text">
            <Question>What is the subject of this letter?</Question>
            <Topic>Subject of Letter</Topic>
        </UserTextQuestion>
        <MultipleChoiceQuestion ID="Employment_type">
            <QuestionType KeyQuestion="true"/>
            <Question>On what basis will <PartyReference IDREF="Employee"
Style="Firstname" Type="PartyDetail_0"/> be employed?</Question>
            <Topic>Position and duties</Topic>
            <SelectionRules AnswerUsing="Default" Cardinality="Single"
Device="Checkbox"/>
            <Responses>
                <Response>
                    <SelectionCriteria Default="Checked"/>
                    <Prompt>On a full time basis</Prompt>
                    <SetValueTo>FullTime</SetValueTo>
                    <Notes>
                        <Note CompletionInstruction="false" ShowExternalUsers="false"
UserLevel="Non-Specialist">
                            <NoteTitle>Full Time Employees</NoteTitle>
                            <NoteBody>
                                <p>Full time employees are required to work at least the
hours specified in the award</p>
                                <p>They are elligible for maternity/paternity leave as well as
annual and sick leave</p>
```

-continued

```
              </NoteBody>
            </Note>
          </Notes>
        </Response>
        <Response>
          <SelectionCriteria Default="Unchecked"/>
          <Prompt>On a part time basis</Prompt>
          <SetValueTo>PartTime</SetValueTo>
        </Response>
        <Response>
          <SelectionCriteria Default="Unchecked"/>
          <Prompt>On a casual basis</Prompt>
          <SetValueTo>Casual</SetValueTo>
        </Response>
      </Responses>
    </MultipleChoiceQuestion>
    <Condition ID="Employment_type.FullTime">
      <Test IDREF="Employment_type" Value="FullTime"/>
    </Condition>
    <Condition ID="Employment_type.PartTime">
      <Test IDREF="Employment_type" Value="PartTime"/>
    </Condition>
    <Condition ID="Employment_type.Casual">
      <Test IDREF="Employment_type" Value="Casual"/>
    </Condition>
    <UserTextQuestion Columns="20" ID="Commencement" Rows="1"
Type="Text">
      <Question>On what date will <PartyREference IDREF="Employee"
Style="Firstname" Type="PartyDetail_0"/>'s employment
commence?</Question>
      <Topic>Position</Topic>
    </UserTextQuestion>
    <UserTextQuestion Columns="20" ID="NumberOfLeaveTypes" Rows="1"
Type="PositiveInteger">
      <Question>How many distinct types of leave is the employee entitled
to?</Question>
      <Topic>Leave Table</Topic>
    </UserTextQuestion>
    <UserTextQuestion Columns="20" ID="LeaveType" Rows="1" Type="Text">
      <Question>Type of Leave?</Question>
      <Topic>Leave Table</Topic>
    </UserTextQuestion>
    <UserTextQuestion Columns="20" ID="LeaveAmount" Rows="1" Type="Text">
      <Question>Number of Weeks?</Question>
      <Topic>Leave Table</Topic>
    </UserTextQuestion>
    <Condition ID="PaidLeave">
      <Or>
        <UseCondition IDREF="Employment_type.FullTime"/>
        <UseCondition IDREF="Employment_type.PartTime"/>
      </Or>
    </Condition>
    <UserTextQuestion Columns="20" ID="EmployeeFirstname" Rows="1"
Type="Text">
      <Question>Please type the <PartyReference IDREF="Employee"
Style="Firstname" Type="PartyDetail_0"/>'s first name</Question>
      <Topic>Employee Setup</Topic>
    </UserTextQuestion>
    <ReusablePhrase ID="PaidOrUnpaidLeave">unpaid <ConditionalPhrase
Condition="PaidLeave">or paid</ConditionalPhrase> leave</ReusablePhrase>
    <MultipleChoiceQuestion ID="AmountOfLeave">
      <QuestionType KeyQuestion="false"/>
      <Question>How much leave is <PartyReference IDREF="Employee"
Style="Firstname" Type="PartyDetail_0"/> entitled to?</Question>
      <Topic>Setup</Topic>
      <SelectionRules AnswerUsing="Bias" Cardinality="Single"
Device="Checkbox"/>
      <Responses>
        <Response>
          <SelectionCriteria Default="Unchecked">
            <PartyAssessment Assessment="Best" IDREF="Employer"/>
          </SelectionCriteria>
          <Prompt>Award entitlements</Prompt>
          <SetValueTo>award</SetValueTo>
        </Response>
        <Response>
          <SelectionCriteria Default="Unchecked">
            <PartyAssessment Assessment="Worst" IDREF="Employer"/>
          </SelectionCriteria>
```

-continued

```
                    <Prompt>By negotiation with <PartyReference IDREF=“Employer”
Style=“Name” Type=“PartyDetail_2”/>
                    </Prompt>
                    <SetValueTo>negotiate</SetValueTo>
                </Response>
            </Responses>
        </MultipleChoiceQuestion>
        <Condition ID=“AmountOfLeave.award”>
            <Test IDREF=“AmountOfLeave” Value=“award”/>
        </Condition>
        <Condition ID=“AmountOfLeave.negotiate”>
            <Test IDREF=“AmountOfLeave” Value=“negotiate”/>
        </Condition>
    </LogicSetup>
</LogicFile>
```

Because the information necessary to process processing instructions encountered within the source document are stored outside the source document, this information can be stored in an XML format and can therefore be validated against an XML schema or DTD. The DTD used by the document assembly system for validating logic sources 210 is as follows:

```
<!ELEMENT LogicFile (MetaInformation, PartiesSetup, LogicSources, LogicSetup)>
<!ELEMENT LogicSources (LogicSource)*>
<!ELEMENT LogicSource (PartyMapping)>
<!ATTLIST LogicSource
    uri CDATA #REQUIRED
>
<!ELEMENT PartyMapping (PartyMap*)>
<!ELEMENT PartyMap (PartyDetailMap)+>
<!ATTLIST PartyMap
    From NMTOKEN #REQUIRED
    To ID #REQUIRED
>
<!ELEMENT PartyDetailMap EMPTY>
<!ATTLIST PartyDetailMap
    From NMTOKEN #REQUIRED
    To ID #REQUIRED
>
<!ENTITY % HtmlParagraphMarkup “b | i | a ”>
<!ENTITY % MappablePCDATA “(#PCDATA | PartyReference)*”>
<!ENTITY % SmartsPhraseLevelDeclarations “ ReusablePhrase | UserTextQuestion ”>
<!ENTITY % SmartsPhraseLevelInsertions “| InsertReusablePhrase |
ConditionalPhrase | InsertUserText”>
<!ENTITY % SmartsConditions “ Condition IDREF #IMPLIED ”>
<!ENTITY % SmartsIdRequired “ID ID #REQUIRED”>
<!ENTITY % SmartsIdImplied “ID ID #IMPLIED”>
<!ENTITY % SmartsIDREF “IDREF IDREF #REQUIRED ”>
<!ENTITY % SmartIDREF “IDREF IDREF #REQUIRED ”>
<!ENTITY % SmartsPCDATA “(#PCDATA | InsertUserText | InsertReusablePhrase |
ConditionalPhrase )*”>
<!ELEMENT MetaInformation (rdf:RDF)>
<!ELEMENT rdf:RDF (rdf:Description)>
<!ATTLIST rdf:RDF
    xmlns:rdf CDATA #FIXED “http://www.w3.org/TR/WD-rdf-syntax-ns#”
    xmlns:dc CDATA #FIXED “http://purl.org/dc/elements/1.1/”
>
<!ELEMENT rdf:Description (Metadata)>
<!ELEMENT Metadata (dc:Type, dc:Title, dc:Source?, dc:Description, dc:Subject,
dc:Creator, dc:Publisher?, dc:Relation*, RevisionHistory, PlannedEnhancements?)>
<!ELEMENT dc:Type EMPTY>
<!ATTLIST dc:Type
    Genesis (Original | Copy | Link) “Original”
    Use (Precedent | Transaction) “Precedent”
    Status (Unapproved | Approved) “Unapproved”
>
<!ELEMENT dc:Title (#PCDATA)>
<!ELEMENT dc:Source (#PCDATA)>
<!ELEMENT dc:Description (#PCDATA)>
<!ELEMENT dc:Subject (Keyword*)>
<!ELEMENT Keyword (#PCDATA)>
<!ELEMENT dc:Creator (Name, Organisation, md.ContactDetails)>
<!ELEMENT Name (#PCDATA)>
```

-continued

```
<!ELEMENT Organisation (#PCDATA)>
<!ELEMENT md.ContactDetails (md.Address | md.Phone | md.Email | md.Fax)+>
<!ELEMENT md.Address (#PCDATA)>
<!ELEMENT md.Phone (#PCDATA)>
<!ELEMENT md.Email (#PCDATA)>
<!ELEMENT md.Fax (#PCDATA)>
<!ELEMENT dc:Publisher (Name, Organisation, md.ContactDetails)>
<!ELEMENT dc:Relation (UsedBy?, MatterNumber?, Client?, Other*)>
<!ELEMENT UsedBy (#PCDATA)>
<!ELEMENT MatterNumber (#PCDATA)>
<!ELEMENT Client (#PCDATA)>
<!ELEMENT Other (Field, FieldValue)>
<!ELEMENT Field (#PCDATA)>
<!ELEMENT FieldValue (#PCDATA)>
<!ELEMENT PlannedEnhancements (Enhancement*)>
<!ELEMENT Enhancement (dc:Contributor, dc:Date, What)>
<!ELEMENT RevisionHistory (Revision*)>
<!ELEMENT Revision (dc:Contributor, dc:Date, What)>
<!ELEMENT dc:Contributor (Name, Organisation, md.ContactDetails)>
<!ELEMENT dc:Date (#PCDATA)>
<!ELEMENT What (#PCDATA)>
<!ATTLIST What
    ChangeType (MajorRework | MinorChanges | BrandNew | ExtraContent | Update)
"BrandNew"
>
<!ELEMENT PartiesSetup (Party*)>
<!ELEMENT Party (DisplayName, Role, PartyDetails)>
<!ATTLIST Party
    %SmartsIdRequired;
    Assessable (true | false) "true"
>
<!ELEMENT DisplayName (#PCDATA)>
<!ELEMENT Role %MappablePCDATA;>
<!ELEMENT PartyDetails (PartyDetail+)>
<!ELEMENT PartyDetail (Value+)>
<!ATTLIST PartyDetail
    Name NMTOKEN #REQUIRED
    %SmartsIdRequired;
>
<!ELEMENT Value %SmartsPCDATA;>
<!ATTLIST Value
    Gender (Male | Female | Neuter | Unspecified) "Unspecified"
    Number (Singular | Plural | Unspecified) "Unspecified"
>
<!ELEMENT PartyReference EMPTY>
<!ATTLIST PartyReference
    %SmartIDREF;
    Type IDREF #REQUIRED
    Style NMTOKEN #IMPLIED
>
<!ELEMENT LogicSetup (Condition | MultipleChoiceQuestion |
%SmartsPhraseLevelDeclarations;)*>
<!ENTITY % booleanSubstitute " Test | UseCondition | And | Or | Not ">
<!ELEMENT Condition (True | False | %booleanSubstitute;)>
<!ATTLIST Condition
    %SmartsIdRequired;
>
<!ELEMENT True EMPTY>
<!ELEMENT False EMPTY>
<!ELEMENT Test EMPTY>
<!ATTLIST Test
    uri CDATA #IMPLIED
    %SmartsIDREF;
    Value CDATA #REQUIRED
>
<!ELEMENT And ((%booleanSubstitute;), (%booleanSubstitute;))>
<!ELEMENT Or ((%booleanSubstitute;), (%booleanSubstitute;))>
<!ELEMENT Not (%booleanSubstitute;)>
<!ELEMENT UseCondition EMPTY>
<!ATTLIST UseCondition
    uri CDATA #IMPLIED
    %SmartsIDREF;
>
<!ELEMENT Question %MappablePCDATA;>
<!ELEMENT Topic %MappablePCDATA;>
<!ELEMENT MultipleChoiceQuestion (QuestionType, Question, Topic, Notes?,
SelectionRules, Responses)>
<!ATTLIST MultipleChoiceQuestion
    %SmartsIdRequired;
```

-continued

```
>
<!ELEMENT QuestionType EMPTY>
<!ATTLIST QuestionType
      KeyQuestion (true | false) "true"
>
<!ELEMENT Responses (Response, Response+)>
<!ELEMENT SelectionRules EMPTY>
<!ATTLIST SelectionRules
      Device (Checkbox | DropdownList) "Checkbox"
      AnswerUsing (Default | Bias) "Bias"
      Cardinality (Single | Multiple) "Single"
>
<!ELEMENT Response (SelectionCriteria, Prompt, SetValueTo, Notes?)>
<!ELEMENT SelectionCriteria (PartyAssessment)*>
<!ATTLIST SelectionCriteria
      Default (Checked | Unchecked) "Unchecked"
>
<!ELEMENT PartyAssessment EMPTY>
<!ATTLIST PartyAssessment
      %SmartsIDREF;
      Assessment (Worst | Bad | Neutral | Good | Best) "Neutral"
>
<!ELEMENT Prompt %MappablePCDATA;>
<!ELEMENT SetValueTo (#PCDATA)>
<!ELEMENT UserTextQuestion (Question, Topic, DefaultText?, Notes?)>
<!ATTLIST UserTextQuestion
      %SmartsIdRequired;
      Columns (1 | 2 | 3 | 4 | 5 | 10 | 15 | 20 | 25 | 30 | 40 | 50 | 60 | 70) "20"
      Rows (1 | 2 | 3 | 4 | 5 | 6 | 7 | 8 | 9 | 10| 12 | 14 | 15 | 16 | 18 | 20 | 25 | 30) "1"
      Type (Text | Duration | Time | Date | Decimal | Integer) "Text"
>
<!ELEMENT DefaultText (#PCDATA)>
<!ELEMENT InsertUserText EMPTY>
<!ATTLIST InsertUserText
      %SmartIDREF;
>
<!ELEMENT ReusablePhrase (#PCDATA %SmartsPhraseLevelInsertions; )*>
<!ATTLIST ReusablePhrase
      %SmartsIdRequired;
>
<!ELEMENT InsertReusablePhrase EMPTY>
<!ATTLIST InsertReusablePhrase
      %SmartIDREF;
>
<!ELEMENT ConditionalPhrase (#PCDATA | PartyReference
%SmartsPhraseLevelInsertions; )*>
<!ATTLIST ConditionalPhrase
      %SmartsConditions;
>
<!ELEMENT Notes (Note)*>
<!ELEMENT Note (NoteTitle, NoteBody)>
<!ATTLIST Note
      UserLevel (Specialist | Non-Specialist) "Non-Specialist"
      ShowExternalUsers (true | false) "false"
      CompletionInstruction (true | false) "false"
>
<!ELEMENT NoteTitle (#PCDATA)>
<!ELEMENT NoteBody (p)+>
<!ELEMENT p (#PCDATA | %HtmlParagraphMarkup;)*>
<!ELEMENT b (#PCDATA)>
<!ELEMENT i (#PCDATA)>
<!ELEMENT a (#PCDATA)>
<!ATTLIST a
      href CDATA #REQUIRED
        target CDATA #FIXED "_blank">
```

Another advantage of separating logic source files 210 from document source files 208 is that the logic source files 210 can also be re-used in conjunction with other XML documents, simplifying maintenance. For similar reasons, it is convenient to store logic information in separate files rather than, for example, one monolithic logic file. This allows related information to be grouped together, and only the logic components that are required need to be re-used with a given source document.

It will be apparent that this information could alternatively be stored in a database rather man separate XML files. Separate XML files are preferred because they can be easily arranged in a hierarchical file system. However, if a logic source which is in use is moved, then a base XML document that refers to the logic source will include an incorrect URI, and will need to be updated. In an alternative embodiment, the repository 208 in which the source documents are stored detects the fact that the logic source has been moved, and updates the references to that logic source automatically, or alternatively, advises a URI resolver (the purpose of which is to translate old locations to actual locations) of the new location. This approach can be implemented with file systems that allow extra code to be executed automatically when a file is moved, renamed or deleted. Many WebDAV server implementations are provided with source code, which would enable a document assembly system which used a webDAV server as its repository 208 to implement this.

In yet a further alternative embodiment, the document assembly system includes a single resource that authoritatively associates the name of a logic source with its location, so that in a reference to a logic source, a source document includes the name of the resource known to the system (together with the party mapping being used, as to which see further below). In this embodiment, only that single resource needs to be updated when a logic source is moved or renamed.

Figure 8:
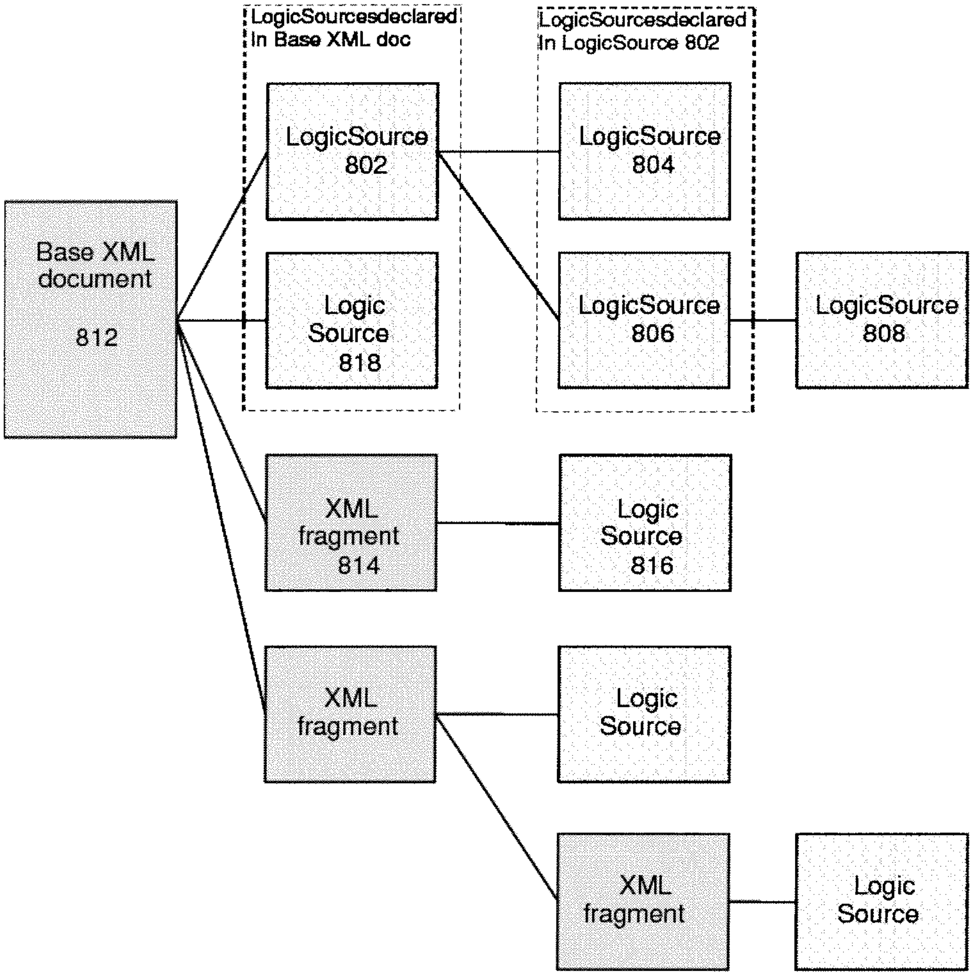
FIG. 8 is a schematic diagram showing the relationships between a base source document and reusable document components referenced by the base source document.

A logic source can refer to one or more other logic sources. For example, FIG. 8 shows a first logic source 802 that builds additional logic on top of that available in second 804 and third 806 logic sources. The third logic source 806, in turn, builds additional logic on top of a fourth logic source 808. However, the base XML document 812 only refers to the first 802 and a fifth 818 logic sources. Thus a convention is needed as to the scope or "visibility" of logic. The convention used in the preferred embodiment is that the only logic sources visible in a particular document (either an XML source document or a logic source) are those declared in that document's <LogicSources> element. Consequently, if the base XML document 812 needed to use a condition defined in the third logic source 806, it would need to import that logic source in its <LogicSources> element. This would be achieved by an administrator editing the source document 812 using the editor 112.

FIG. 8 also shows the base XML document 812 reusing an XML fragment 814 by reference. A "SmartModule" processing instruction is used for this purpose because use of the source document of the standard XML inclusion mechanism Xinclude, documented at http://www.w3.org/TR/xinclude/, would invalidate the source document unless the grammar for the source document specifically allowed its use. In FIG. 8, the XML fragment 814 imports a sixth logic source 816. The latter is not visible to the base XML document 812.

Assembled documents often refer to one or more parties. For example, a legal document might refer to the parties involved in an agreement of some kind. In such cases there are often only two parties involved, but in some circumstances there may be many parties. A logic source specifies the parties known to it, in its PartiesSetup element.

A party mapping is a child on a logic source import that allows parties used in a logic source to be mapped to parties used in a document importing the logic source. This makes it possible for a logic source which, for example, refers to a Plumber and a Homeowner, to be used in a document between a Banker and a Customer.

A party mapping chain is a chain of party mappings between a base XML document and a logic source. It will be evident that a party mapping chain can swap two parties around e.g., if the LogicSource import statement in the base XML document 812 for the first logic source 802 said, in effect, "Employer becomes Employee and Employee becomes Employer". Thus two references to the same physical logic source are regarded as logically the same if and only if their respective party mapping chains result in the same party mapping.

It is not an error to import the same logic source twice in a single LogicSources statement (allocating each occurrence a distinct ID). This allows one physical question or condition to be used for two logical questions by defining different party mappings in each LogicSource import statement.

In addition to those described above, the example source document and logic source above include seven other types of processing instruction:

(i) Condition
(ii) InsertReusablePhrase
(iii) InsertUserText
(iv) PartyReference
(v) ArrayRowIterator
(vi) SmartModule
(vii) Notes
(viii) MetaInformation For half of these, there is a correspondence between a processing instruction in a source XML document and an element in a referenced logic source. That is, when software manipulates or interprets the processing instruction, it does so in conjunction with the corresponding element in the logic source. This correspondence is as follows:

| Processing Instruction | LogicSource |
|---|---|
| Condition | Condition |
| InsertReusablePhrase | ReusablePhrase |
| InsertUserText | UserTextQuestion |
| PartyReference | Party |

ArrayRowIterator, SmartModule, Notes and MetaInformation are exceptions to this—an ArrayRowIterator is independent, as is Notes and MetaInformation, while a SmartModule has a correspondence with a fragment of XML stored at some other URI.

A Condition processing instruction specifies by convention that its parent element should only be included in the instance document if the associated condition evaluates to true. For example, the following condition is taken from the example source document given above.

```
<p>
    <?SpeedLegal <Condition IDREF="AmountOfLeave.negotiate"
    LogicSource="LogicSource_1"/>?>The amount of leave is
    negotiated with the employee.</p>
```

This means that the <p> element will only be included in an instance document generated from this source document if the Condition AmountOfLeave.negotiate in the logic source named "LogicSource_1" is true. It will be apparent that alternative embodiments could be developed to implement the condition is other ways. For example, the Condition could by convention apply to the following sibling, or Condition open and Condition close processing instructions could be used to surround the XML to which the condition is to apply. However, neither of these approaches is preferred. In the first case, there may be no following sibling. In the second case, if the open and close processing instructions are not properly nested so that they precede and follow, respectively, a matching pair of tags, then the resulting instance document would not be well-formed. Similarly, the syntax of the Condition PI could have been written in various ways, some of which include data that looks like XML, and others that do not, including:

```
(i)    <?SpeedLegal <Condition IDREF="AmountOfLeave.negotiate"
       LogicSource="LogicSource_1"/>?>
(ii)   <?SpeedLegal <Logic type="condition"
       IDREF="AmountOfLeave.negotiate"
       LogicSource="LogicSource_1"/>?>
```

-continued

```
(iii)   <?Condition <data IDREF="AmountOfLeave.negotiate"
        LogicSource="LogicSource_1"/>?>
(iv)    <?Condition IDREF="AmountOfLeave.negotiate"
        LogicSource="LogicSource_1"?>
(v)     <?Condition IDREF="AmountOfLeave.negotiate";
        LogicSource="LogicSource_1"?>
(vi)    <?Condition LogicSource_1#AmountOfLeave.negotiate"?>
```

However, the first of these is the form used in the preferred embodiment.

The IDREF attribute of a condition PI specifies the ID of the condition to be tested; the LogicSource attribute is an IDREF to the logic source in which the condition is defined. For example, the logic source file with an IDREF of "LogicSource_1" and listed above contains the definition of the AmountOfLeave.negotiate condition, as follows:

```
<Condition ID="AmountOfLeave.negotiate">
    <Test IDREF="AmountOfLeave" Value="negotiate"/>
</Condition>
```

This means that the condition will evaluate to true if the response given for the question named (i.e., with an IDREF equal to) "AmountOfLeave" has the value "negotiate". The question "AmountOfLeave" is a multiple choice question defined in the logic source, as follows:

```
<MultipleChoiceQuestion ID="AmountOfLeave">
    <QuestionType KeyQuestion="false"/>
    <Question>How much leave is <PartyReference IDREF="Employee"
                Style="Firstname" Type="PartyDetail_0"/>
                entitled to?</Question>
    <Topic>Setup</Topic>
    <SelectionRules AnswerUsing="Bias" Cardinality="Single"
                Device="Checkbox"/>
    <Responses>
        <Response>
            <SelectionCriteria Default="Unchecked">
                <PartyAssessment Assessment="Best"
                IDREF="Employer"/>
            </SelectionCriteria>
            <Prompt>Award entitlements</Prompt>
            <SetValueTo>award</SetValueTo>
        </Response>
        <Response>
            <SelectionCriteria Default="Unchecked">
                <PartyAssessment Assessment="Worst"
                IDREF="Employer"/>
            </SelectionCriteria>
            <Prompt>By negotiation with <PartyReference
            IDREF="Employer"
                Style="Name" Type="PartyDetail_2"/>
            </Prompt>
            <SetValueTo>negotiate</SetValueTo>
        </Response>
    </Responses>
</MultipleChoiceQuestion>
```

In this example, the MultipleChoiceQuestion element's QuestionType child has value "false" for attribute KeyQuestion. This means that the processing engine 202 is free to attempt to answer this question itself (i.e., without interacting with any external agent) using its scoring procedure if the user or software invoking the Processing Engine 202 indicated they only wished to be asked Key Questions.

Figure 11:
FIG. 11 is a screenshot of a multiple choice question displayed by a web browser during the document assembly process.

If the SelectionRules element has value "Bias" for the AnswerUsing attribute, as is the case here, then the processing engine 202 scores each response based on the values contained in its SelectionCriteria child and which party the user or software invoking the Processing Engine 202 indicated they wish to favour. Alternatively, if the SelectionRules element has value "Default" for the AnswerUsing attribute, then the processing engine 202 selects the response for which the SelectionCriteria element's "Default" attribute has value "Checked". For example, FIG. 11 shows a screenshot of a web browser window displaying this question in HTML generated by the Java Controller servlet 218 of the document assembly system.

In the above example, the MultipleChoiceQuestion is defined in the logic source that also defines the condition. However, a definition in a different logic source can be used, assuming that different logic source was declared in the LogicSources element (of the logic source which defines the condition), by including its IDREF name (i.e., the name assigned to it in the logic sources element) in the Test element, for example:

<Test IDREF="AmountOfLeave" Value="negotiate" LogicSource="LogicSource804"/>

A condition can be defined in terms of other conditions, using boolean logic operators. In the example, the Condition PaidLeave is defined as follows:

```
<Condition ID="PaidLeave">
    <Or>
        <UseCondition IDREF="Employment_type.FullTime"/>
        <UseCondition IDREF="Employment_type.PartTime"/>
    </Or>
</Condition>
```

This condition will be true if either the condition Employment_type.FullTime is true or the condition Employment_type.PartTime is true.

It will be evident that condition PIs as described above can only be attached to elements. The question arises—what if it is desired to attach a condition to some text which is not tagged (or it is not desired to tag, or, because of the grammar, cannot be tagged) with an element to which a condition can be attached. There are several possible solutions to this. One possibility is to define opening and closing Condition PIs that surround the text in question. However, this approach has drawbacks already adverted to above. In the preferred embodiment, the text is defined in a logic source, and an "InsertReusablePhrase" processing instruction is used to refer to it in the source document.

There is an InsertReusablePhrase in the example XML document above:

```
<p> . . . may request <?SpeedLegal <InsertReusablePhrase
IDREF="PaidOrUnpaidLeave" LogicSource="LogicSource_1"/>?> by
filling in a request form at least one month prior to the earliest date
required.</p>
```

The corresponding ReusablePhrase with ID "PaidOrUnpaidLeave" is defined in the logic source as follows;

```
<ReusablePhrase ID="PaidOrUnpaidLeave">unpaid <ConditionalPhrase
Condition="PaidLeave">or paid</ConditionalPhrase>
leave</ReusablePhrase>
```

Thus a ReusablePhrase can contain not only text, but other things which are evaluated. One of these is a "ConditionalPhrase". This is an element which is defined in the logic source schema or DTD, mainly for the purpose of allowing a condition to be attached. In this way a ReusablePhrase can be used to conditionally insert text into the XML document in the absence of an element to which a condition can otherwise be attached. In alternative embodiments, a condition could be attached directly to the ReusablePhrase element as an attribute, or a new processing instruction defined which specifies both a condition and the text to be inserted if the condition is true.

Information entered by a user in response to a question can also be inserted into an instance document. For example, suppose that the source document listed above included the following processing instruction:

```
<?SpeedLegal
    <InsertUserText IDREF="LetterSubject"
    LogicSource="LogicSource_1"/>
?>
```

The rendering engine 204 processes this instruction by inserting, in the instance document, the value (i.e., the response provided by the user) of the user text question with ID "LetterSubject" that is defined in the logic source "LogicSource_1".

That user text question is defined in the logic source as follows:

```
<UserTextQuestion Columns="20" ID="LetterSubject" Rows="1"
Type="Text">
    <Question>What is the subject of this letter?</Question>
    <Topic>Subject of Letter</Topic>
</UserTextQuestion>
```

The type attribute restricts the allowed type of input to the specified format, which is one of text, duration, time, date, decimal, or integer. In this example, the user can enter free text.

In an alternative embodiment, users are given greater flexibility to define and use their own variable types. This gives the user the ability to validate a broader and more complex range of data types than is possible with a closed set. For example, a UserTextQuestion can be assigned a defined data type as follows:

```
<UserTextQuestion AskEachRepeat ="false" Columns="20"
ID="HourlyRate" Rows="1" Type="DollarValue">
    <Question>What is <PartyReference IDREF="Recruit"
    Style="Shortname"
    Type="PartyDetail_10"/></PartyReference>'s hourly
    rate?</Question>
    <Topic>Salary, benefits and payment</Topic>
    <DefaultText>$40</DefaultText>
</UserTextQuestion>
```

More generally, a Variable has an assigned data type, as follows:

```
<Variable type=name"DollarValue" name="ContractorHourlyRate"
query="ContractorRate"/>
```

The data types are defined either in the logic file:

```
<DataTypes xmlns="http://www.w3.org/2001/XMLSchema">
    <simpleType name="DollarValue">
        <annotation>
            <documentation>
            An amount of money in dollars, as in "$100.50"
            </documentation>
        </annotation>
        <restriction base="string">
            <pattern value="$[0-9] + (\.[0-9]{2})?"/>
        </restriction>
    <simpleType>
</DataTypes>
```

or in a separate location for global access:

```
<?xml version="1.0" encoding="utf-8"...?>
<schema xlmns="http://www.w3.org/2001/XMLSchema">
    <!-- Some example types -->
    <simpleType name="NonEmptyString">
        <annotation>
            <documentation>A string containing at least one character</documentation>
        </annotation>
        <restriction base="string">
            <minLength value="1"></minLength>
        </restriction>
    </simpleType>
<simpleType name="SimpleDate">
    <annotation>
        <documentation>A date in the format "15 Jan 2002"</documentation>
        <appinfo>
            <SL:DateFormat
xmlns:SL="http://www.speedlegal.com/namespaces/smarts">dd MMM yyyy<//SL:DateFormat>
        </appinfo>
    </annotation>
    <restriction base="string"></restriction>
</simpleType>
<simpleType name="DollarValue">
    <annotation>
        <documentation>An amount of money in dollars, as in "$100.50"</documentation>
    </annotation>
    <restriction base="string">
        <pattern value="$[0-9] + (\.[0-9]{2})?"></pattern>
    </restriction>
</simpleType>
```

This data typing relies on XML-Schema simple types, as described at http://www.w3.org/TR/xmlschema-2/.

The documentation element of the simpleType is used to provide explanatory text to the user during the authoring and interview stages. Document authors are provided with a list of available data types. Once a Variable is assigned a type, the Query that populates it returns content of the required type. If the Query results in an Interview Item, the user inputs data of the required type. If the input data is not of the required type, then the user is provided with feedback using the documentation element, and is informed as to what data-type is expected. The Interview Item is then re-answered.

During the authoring process, the documentation element can be used to indicate to an author what each data type is intended to represent.

The appinfo element of a simpleType can be used to perform customised checking in addition to schema type checking. In the example above. SimpleDate is a custom date format. A value of this type is validated in two phases. It is first checked to be a string according to the normal schema validation rules, identified as such via the restriction element. Secondly, it is checked using a separate more specific validation function identified by the appinfo element.

Interview Item responses are type-checked using schema data type validation functions. These are available in libraries such as Sun's XML Data Types Library (xsdlib), available at http://wwws.sun.com/software/xml/developers/xsdlib2/. These functions can also be used within the authoring environment to check the type of default values.

In the preferred embodiment, MultipleChoiceQuestion and UserTextQuestion are distinct elements, even though their content shares some common characteristics (e.g., a question). In an alternative embodiment, the common characteristics are abstracted out in the DTD, (or, alternatively, schema) as follows:

```
<!ELEMENT InterviewItem (question, Topic, Notes?,
(MultipleChoiceQuestion | UserTextQuestion )) >
```

Indeed, the InterviewItems package 408 of the Processing Engine 202 of the preferred embodiment uses an abstract class called InterviewItem that captures the commonalties between MultipleChoiceQuestion, UserTextQuestion, etc, with subclasses that represent the specifics of each case.

Moreover, although UserTextQuestion is implemented with a type attribute in the preferred embodiment, the different types could alternatively be implemented as elements in their own right, in which case the InterviewItem element declaration might look like:

```
<!ELEMENT InterviewItem (question, Topic, Notes?,
(MultipleChoiceQuestion | UserTextQuestion | Duration |
Time | Date | Decimal | Integer )) >
```

A party reference processing instruction is used by the processing engine 202 to generate text referring to a party. For example, the following:

```
<?SpeedLegal
  <PartyReference IDREF="Employee"
LogicSource="LogicSource_1"
  Style="Pronoun" Type="PartyDetail_1"/>
?>
```

in a source XML document results in the insertion, into the instance document, of the value of the PartyDetail whose ID corresponds to the Type attribute for that party. In this example, the relevant party is "Employee".

```
<Party Assessable="true" ID="Employee">
  <DisplayName>Employee</DisplayName>
  <Role>The person to be offered a position under this letter.</Role>
  <PartyDetails>
    <PartyDetail ID "PartyDetail _0" Name="Firstname">
      <Value Gender="Unspecified" Number="Unspecified">
        <InsertUserText IDREF="EmployeeFirstname"/>
      </Value>
    </PartyDetail>
    <PartyDetail ID="PartyDetail_1" Name="Pronoun">
      <Value Gender="Unspecified" Number="Singular">He</Value>
      <Value Gender="Female" Number="Singular">She</Value>
      <Value Gender="Unspecified" Number="Plural">They</Value>
    </PartyDetail>
  </PartyDetails>
</Party>
```

It can be seen from this example that the PartyDetail can contain values for different Gender and Number. Assuming the Gender and Number of the party has been ascertained (in this embodiment a question to do so is automatically generated by the processing engine 202 when required), the corresponding value can be evaluated by the Processing Engine 202, and inserted by the Rendering Engine 204, as described below.

It will be evident that other attributes could be included on the PartyDetail Value children, for example, "Formal", which would be useful with some languages other than English.

The example document contains a processing instruction specifying an ArrayRowIterator:

```
<tr>
  <?SpeedLegal <ArrayRowIterator repeat="NumberOfLeaveTypes"/>?>
    <td><?SpeedLegal <ArrayReference IDREF="LeaveType"/>?>
```

If an XML element has an ArrayRowIterator child, then that element (<tr> in this example) will be copied into the instance document one or more times. When the source document is processed by the Processing Engine 202, the processing engine 202 determines how many times that element is to be included in the instance document. To determine this, it uses a "repeat" attribute. If the value of the repeat attribute is a positive integer, then the element is included that many times. Otherwise, the value of the repeat attribute is the name of an interview item that can only take an integer response (preferably, any limit on the range is specified in that interview item).

For each time it is copied in, a distinct value is required for each Interview Item referred to in an ArrayReference processing instruction. For example, if the value of the repeat attribute was 2, then the first time the <tr> element appeared (e.g., the first row), the UserTextQuestion "LeaveType" might have value "Annual Leave"; and the second time (e.g., the second row), "Maternity Leave".

The InterviewItems package 408 contains a class that represents an ArrayRowIterator. The ArrayRowIterator class contains a collections object which contains UserTextQuestions and MultipleChoiceQuestions for each row. When the ArrayRowIterator is passed to the invoking process 412 to be answered, the UserTextQuestions and MultipleChoiceQuestions contained within it are asked as necessary.

In the preferred embodiment, there is no corresponding element in any logic source for an ArrayRowIterator processing instruction. In other words, nothing is needed in any of the logic sources (beyond ordinary Interview Items e.g., MultipleChoiceQuestions and UserTextQuestions) which are referenced by the ArrayReference processing instructions).

It is often desirable to use an Interview Item, within an element that has an ArrayRowIterator child, that takes the same value each time the element is repeated (in other words, such an Interview Item does not get asked for each row).

Consequently, the preferred embodiment uses the same value each time unless an ArrayReference processing instruction is provided. The ArrayReference processing instruction specifies that the corresponding item is to be treated as an array of questions (e.g., asked again for each row), rather than assuming this for any interview item that occurs within an element with an ArrayRowIterator child. If that assumption were valid, then there would not be any need for an ArrayReference processing instruction.

An alternative embodiment which did not make this assumption but also did not use an ArrayReference processing instruction might include an attribute on each Interview Item which indicated whether in an array the interview item was asked just once, or once each array iteration. For example, that attribute might be named ArrayRowIteratorBehavior with allowed values "variant" or "invariant", and appear on the Question child of a UserTextQuestion or MultipleChoiceQuestion.

A SmartModule processing instruction is used in a source document to indicate that a fragment of XML at a specified URI is to be retrieved when the source document is run through the processing engine 202. For example, the following is taken from the example source document:

```
<?SpeedLegal
  <SmartModule uri="/home/jml/termination.sm">
    <PartyMapping>
      <PartyMap From="Contractor" To="Employee">
        <PartyDetailMap From="Shortname" To="Firstname"/>
        <PartyDetailMap From="Fullname" To="Firstname"/>
      </PartyMap>
    </PartyMapping>
  </SmartModule>
?>
```

Figure 9:
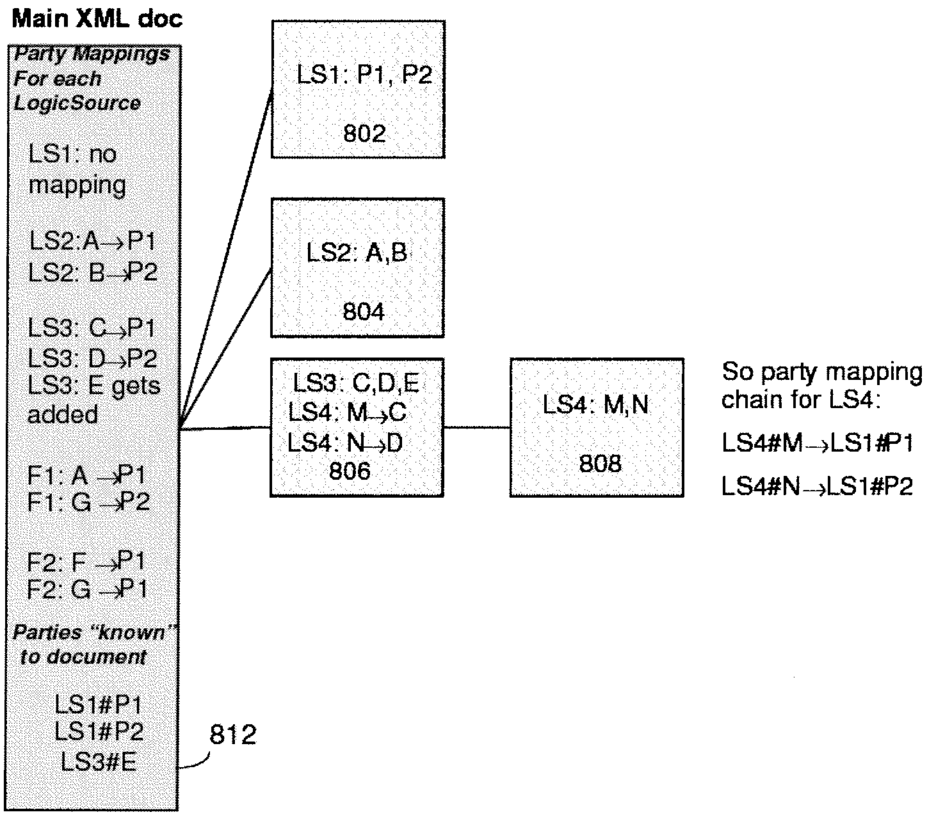
FIGS. 9 and 10 are schematic diagrams illustrating party mapping performed by the system.

The PartyMapping is used to translate PartyReferences in the XML fragment referenced by the SmartModule PI to references to party details on parties that are known to the source XML document. For example, consider a bass or main XML document 812 that refers to parties P1, P2, and E, as shown in FIG. 9, The XML document 812 references the first logic source 802 which contains references to parties P1 and P2. The XML document 812 also references a second logic source 804 that contains references to parties A and B only. The base document 812 also references a third logic source 806 that contains references to parties C, D, and E only. However, the third logic source 806 itself refers to a fourth logic source 808, containing references to parties M and N. The third logic source 806 (which defines parties C, D and E) needs to use logic contained in the fourth logic source 808. However, the only party names "known" to the fourth logic source 808 are M and N. To allow the logic referring to parties M and N in the fourth logic source 808 to be used for parties C and D, the reference to the fourth logic source 808 in the third logic source 806 includes party mapping instructions to map any references to party M in logic imported from the fourth logic source 808 to refer instead to party C. Similarly, party N is mapped to party D. By performing this party mapping, the third logic source 806 is able to use the logic contained in the fourth logic source 808 in statements referring to parties known only to the third logic source 806.

Referencing and party mapping can be nested. In order for the main XML document 812 to make use of the logic contained in the second logic source 804 and the third logic source 806, the main document 812 includes party mapping instructions to map parties A and B of the second logic source 804 to parties P1 and P2, respectively. For the third logic source 806, parties C and D are mapped to parties P1 and P2, respectively; because there is no mapping for party E, it becomes "known" to the main XML document). However, because the third logic source 806 contains a reference to the fourth logic source 808, the logic imported from the fourth logic source 808 effectively undergoes two levels of party mapping, referred to as a party mapping chain. That is, references to parties M and N in logic from the fourth logic source 808 that were already mapped to C and D as described above are now mapped again, in this case to parties P1 and P2, respectively, when imported into the main XML document 812.

If a single logic source is used more than once (e.g., it is used in different logic sources, in which case, in the example in FIG. 8, that logic source would be depicted more than once), then instances of a piece of logic contained within it that is used more than once are regarded as distinct if and only if the party mapping chains for the instances of the logic sources are distinct.

Figure 10:
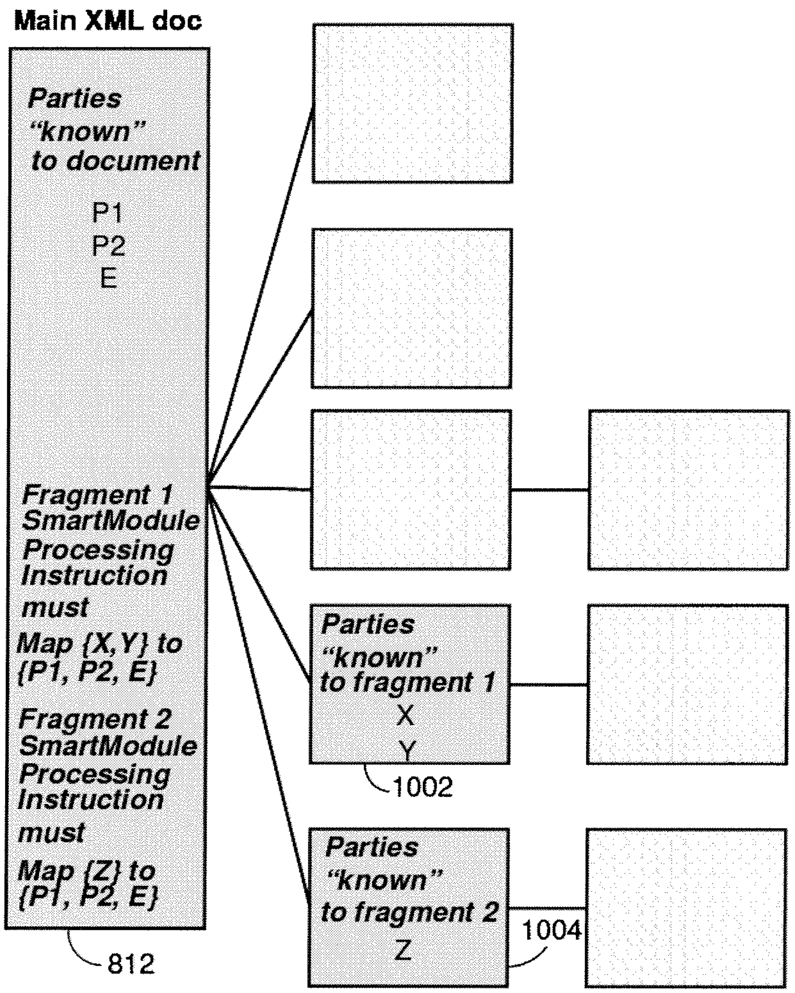

As shown in FIG. 10, party mapping can also be performed for XML source fragments imported into the main XML source document 812 via a SmartModule processing instruction. For example, a first XML fragment 1002 contains references to parties X and Y. In order to import this fragment 1002 into the main XML document 812, these parties are mapped to parties known to the main XML document 812, i.e., two of the parties P1, P2, and E. Similarly, a second fragment 1004 containing references to a party Z can be imported into the main XML document 812 by mapping the party Z to one of these three parties.

A Notes processing instruction is used to present one or more notes to a user, via their browser display and/or in a printed document. For example:

```
<?SpeedLegal
  <Notes>
    <Note CompletionInstruction="false" ShowExternalUsers="false"
        UserLevel="Non-Specialist">
      <NoteTitle>Paid and Unpaid Leave</NoteTitle>
      <NoteBody><p>All employees can request <b>unpaid</b>
        leave</p><p>Only <b>Full-time</b> or <b>Part-time</b>
        employees who have accrued leave can request <b>paid</b>
        leave.</p></NoteBody>
    </Note>
  </Notes>
?>
```

The CompletionInstruction attribute indicates whether the note provides information as to how the document should be completed; the ShowExternalUsers and UserLevel attributes allow the note to be shown or not shown, depending on whether the user matches the specified criteria. UserLevel can be defined arbitrarily. A user is defined to be external for the purposes of ShowExternalUsers if, in a role-based access control system, the user is in an external role (i.e., external to the organisation running the document assembly system). Notes can also be attached to a question or a response of a UserTextQuestion or a MultipleChoiceQuestion in a logic source.

The MetaInformation processing instruction allows meta-information to be attached to an element in a source document. There is also a MetaInformation element defined in the grammar for a Logic Source. In this embodiment, that definition uses concepts provided by RDF and Dublin Core, as described at http://www.w3.org/TR/REC-rdf-syntax and http://dublincore.org/schemas/xmls/, respectively. The format of the MetaInformation PI data is the same as the definition of the MetaInformation element in the Logic Source grammar.

Most of the examples presented above demonstrate the resolution of MultipleChoiceQuestions and UserTextQuestions by presenting a question to an end user and receiving a response to that question from the end user. In an alternative embodiment, where UserTextQuestions, ReusablePhrases, Conditions and ArrayRowIterators (Repeats) are viewed as specific instances of a general class of constructs named Variables, a LogicFile can be constructed such that Variables are able to be resolved from other sources (Queries).

Consider the following LogicFile elements:

```
<LogicSetup>
    <DataTypes xmlns="http://www.w3.org/2001/XMLSchema">
      <simpleType name="DollarValue">
        <annotation>
          <documentation>
            An amount of money in dollars, as in "$100.50"
```

-continued

```
            </documentation>
          </annotation>
          <restriction base="string">
            <pattern value="$[0-9] + (\.[0-9]{2})?"/>
          </restriction>
        <simpleType>
        <simpleType name-"SimpleDate">
          <annotation>
            <documentation>A date in the format "15 Jan
2002"</documentation>
          <appinfo>
            <SL:DateFormat
xmlns:SL="http://www.speedlegal.com/namespaces/smarts">dd MMM
yyyy
            </SL:DateFormat
          </appinfo>
          </annotation>
          <restriction base="string"></restriction>
        </simpleType>
      <DataTypes>
      <Datasources>
        <DataSource type="jdbc" name="database1">
          <Param name="driver" value="com.microsoft.mssql.Driver"/>
          <Param name="url" value="jdbc://127.0.0.1"/>
          <param name="username" value="Generic Username"/>
          <param name="password" value="Generic Password"/>
        </DataSource>
      </Datasources>
      <Variables>
        <Variable type="SimpleDate" name="StartDate"
        query="GetStartDate"/>
        <Condition name="MaternityLeave" query="IsFemale"/>
        <Repeat name="NumberJobs" query="NumberJobOpenings"/>
        <Variable type="number" name="CalculatedNumber"
        query="js-1" />
        <Variable type="DollarValue" name="ContractorHourlyRate"
query="ContractorRate"/>
      </Variables>
      <Queries>
        <Query name="GetStartDate">
          <Answers>
            <Answer ref="StartDate"/>
          </Answers>
          <UserTextQuestion columns="40" rows="1">
            <Question>Please enter <PartyReference party="Employee"
style="Shortname" ref="N232"/>'s starting date</Question>
            <DefaultText>01 Jan 2003</DefaultText>
          </UserTextQuestion>
        </Query>
        <Query name="IsFemale">
          <Answers>
            <Answer ref="MaternityLeave"/>
          </Answers>
```

-continued

```
          <Condition>
            <Test var="EmployeeGender" equals="female"/>
          </Condition>
        </Query>
        <Query name="ContractorRate">
```

-continued

```
          <Answers>
            <Answer ref="ContractorHourlyRate"/>
          </Answers>
          <Constant value="25.00"/>
        </Query>
        <Query name="js-1">
          <Answers>
            <Answer ref=CalculatedNumber"/>
          </Answers>
          <Script language="javascript">
            <Parameters>
              <Parameter ref="reference-to-some-parameter"
              name="foo"/>
              <Parameter ref="reference-to-another-param"
              name="bar"/>
            </Parameters>
            <Function>
                (foo + bar) / 10 * Math.cos (foo+1)
            </Function>
          </Script>
        </Query>
        <Query sourcc="database1" name="NumberJobOpenings">
          <Answers>
            <Answer ref="NumberJobs"/>
          </Answers>
          <DatabaseQuery>
            <Parametar name="arg1" ref=Department"/>
            <Result column="1" ref="NumberJobs"/>
            <Query>
              select count (positions) from positions where
department=${arg1} and filled=false;
            </Query>
          </DatabaseQuery>
        </Query>
      </Queries>
    </LogicSetup>
```

In the fragment above, five Variables or differing types are defined and their values are obtained from various sources, as listed in the Table below.

| Variable Name | Type | Source |
|---|---|---|
| StartDate | SimpleDate | Uses UserTextQuestion Interview Item to obtain value |
| MaternityLeave | Condition (boolean) | Test answer to a MultipleChoiceQuestion Interview Item to determine gender |
| NumberJobs | Repeat (nonNegativeInteger) | Uses a database query to determine the number of unfilled positions in a given department |
| CalculatedNumber | number | Calculates a result on a function and other Variables defined in the Logic File |
| ContractorHourlyRate | DollarValue | Constant value |

In this embodiment, a UserTextQuestion is an Interview Item Query that is used to populate a Variable of any data type. A Condition is a Variable of fixed type (boolean) that obtains a true or false value from a Query. Repeats or ArrayRowIterators are Variables of fixed type (integer zero or greater—nonNegativeInteger) where the value is obtained from a Query. A Variable is a general element of any type that obtains its value from a defined Query. ReusablePhrases are collections of arbitrary Conditional text, PartyReference and InsertUserText elements defined within the logic file that allow users to conveniently define reusable objects. A Query is an element that populates one or more Variables (Answers) by taking in zero or more Parameters (other Variables). Queries encompass:

(i) InterviewItems where the Query is resolved via the interview e.g. MultipleChoiceQuestions. UserTextQuestions;

(ii) evaluations where the Query is resolved by the result of some function expressed using set syntactic rules. The evaluation syntax allows different languages to be used to evaluate the expression. In the example above JavaScript is used. Parameters may be passed into the function and these can be given local aliases such that language specific variable name constraints are not violated; and (iii) other queries such as database lookups, extraction of information from other files, retrieval from web services, directory services etc. In the example above a database lookup is demonstrated where the database setup parameters are defined within the <DataSources> element. Alternatively these parameters could be defined in a separate location for global access.

A Query contains references to the Variables or Answers that it populates. A single Query can potentially resolve many Variables. This is especially useful for database sources where one lookup can return many fields of data. A Variable may also reference its resolving Query for convenience, A Query implementation may contain a default value that is used when the Query fails. Queries may fail for a variety of reasons including inaccessibility, recursive or looping queries, incorrect syntax, and incorrect setup.

Failure mechanisms can be defined such as:

(i) document is not generated and feedback is presented to the user;

(ii) document is generated with default text if it exists or markers such as ## if it does not; and (iii) the user is prompted to provide the information that the Query could not resolve.

It should be noted that the LogicFile structure depicted above decouples the declaration of the Variable from information about where and how it is resolved.

Variables can be referenced within an XML document as follows:

```
<?xml version="1.0" encoding="UTF-8"?>
<!DOCTYPE Letter PUBLIC "-//SpeedLegal//Letter 1v0//EN"
"file:///home/speedlegal/dtd/xhtml-letter/dtd/xhtml-letter-v2.dtd">
<Letter>
  <?SpeedLegal
    <LogicSources>
      <LogicSource ID="LogicSource_1" uri="/files/logic/LS1WD.lgc"
version="/history/SmartRepository/9/1.2"/>
      <LogicSource ID="LogicSource_2" uri="/files/logic/LS2WD.lgc
version="/history/SmartRepository/19/1.6">
        <PartyMapping>
          <PartyMap From="Contractor" To="Employee">
            <PartyDetailMap From="Shortname" To="Firstname"/>
            <PartyDetailMap From="Fullname" To="Firstname"/>
          </PartyMap>
        </PartyMapping>
      </LogicSource>
    </LogicSources>
  ?>
  <?SpeedLegal
    <MetaInformation>
      <rdf:RDF xmlns:dc="http://purl.org/dc/elements/1.1/"
xmlns:rdf="http://www.w3.org/TR/WD-rdf-syntax-ns#">
        <rdf:Description>
          <Metadata>
            dc:Type Genesis="Original" Status="Unapproved"
Use="Precedent"/>
            <dc:Title>Letter template</dc:Title>
            <dc:Description>Template business letter</dc:Description>
            <dc:Subject><Keyword>Letter</Keyword></dc:Subject>
            <dc:Creator>
              <Name>SpeedLegal</Name>
              <Organisation>SpeedLegal</Organisation>
              <md.ContactDetails>
                <md.Address>Level 4, 85 Queen Street, Melbourne,
Victoria</md.Address>
                <md.Phone>+61 3 9670 0141</md.Phone>
                <md.Email>info@speedlegal.com</md.Email>
                <md.Fax>+61 3 9670 0142</md.Fax>
              </md.ContactDetails>
            </dc:Creator>
            <RevisionHistory>
  <Revision><dc:Contributor><Name>SpeedLegal</Name><Organisation>SpeedLegal
</Organisation><md.ContactDetails><md.Address>Level 4, 85 Queen Street,
Melbourne, Victoria</md.Address><md.Phone>+61 3 9670
0141</md.Phone><md.Email>info@speedlegal.com</md.Email><md.Fax>+61 3 9670
0142</md.Fax></md.ContactDetails></dc:Contributor><dc:Date>6/2/2002
13:49</dc:Date><What ChangeType="BrandNew">Letter creation</What></Revision>
            </RevisionHistory>
          </Metadata>
        </rdf:Description>
      </rdf:RDF>
```

-continued

```
        </MetaInformation>
    ?>
    <LetterHead>
        </Date>
        <Salutation/>
    </LetterHead>
    <LetterBody>
        <p>
            <?SpeedLegal <PartyReference IDREF="Employee"
LogicSource="LogicSource_1" Style="Firstname" Type="PartyDetail_0"/> ?> shall
commence work on <?SpeedLegal <InsertUserText IDREF="StartDate"
LogicSource="LogicSource_1" /> ?>.
        <p>
            <?SpeedLegal
                <Condition IDREF="PaidLeave" LogicSource="LogicSource_1"/>
            ?>
            <?SpeedLegal
                <PartyReference IDREF="Employee" LogicSource="LogicSource_1 "
Style="Pronoun" Type="PartyDetail_1"/>
            ?> shall be eligible for paid leave.</p>
        <p>
            <?SpeedLegal
                <Notes>
                    Note CompletionInstruction="false" ShowExternalUsers="false"
UserLevel="Non-Specialist">
                        <NoteTitle>Paid and Unpaid Leave</NoteTitle>
                        <NoteBody><p>All employees can request <b>unpaid</b>
leave</p><p>Only <b>Full-time</b> or <b>Part-time</b> employees who have
accrued leave can request <b>paid</b> leave.</p></NoteBody>
                    </Note>
                </Notes>
            ?>
            <?SpeedLegal
                <PartyReference IDREF="Employee" LogicSource="LogicSource_1"
Style="Firstname" Type="PartyDetail_0"/>
            ?> may request <?SpeedLegal <InsertReusablePhrase
IDREF="PaidOrUnpaidLeave" LogicSource="LogicSource_1"/>?> by filling in a request
form at least one month prior to the earliest date required.</p>
        <p>
            <?SpeedLegal <Condition IDREF="AmountOfLeave.negotiate"
LogicSource="LogicSource_1"/>?>The amount of leave is negotiated with the
employee.</p>
        <p>
            <?SpeedLegal <Condition IDREF="AmountOfLeave.award"
LogicSource="LogicSource_1"/>?>The amount of leave is determined according to the
relevant award.</p>
        <p>The employee has the following leave entitlements: <object>
                <table>
                    <tbody>
                        <tr>
                                <?SpeedLegal <Repeat ID="NumberOfLeaveTypes"/>?>
                            <td><?SpeedLegal <InsertUserText IDREF="LeaveType"/>?>
</td>
                            <td><?SpeedLegal <InsertUserText IDREF="LeaveAmount"/>?>
</td>
                        </tr>
                    </tbody>
                </table>
            </object>
        </p>
        <?SpeedLegal
            <SmartModule uri="/home/jml/termination.sm"
version="/history/SmartRepository/10/1.5">
                <PartyMapping>
                    <PartyMap From="Contractor" To="Employee">
                        <PartyDetailMap From="Shortname" To="Firstname"/>
                        <PartyDetailMap From="Fullname" To="Fullname"/>
                    </PartyMap>
                </PartyMapping>
            </SmartModule>
        ?>
    </LetterBody>
    <LetterTail>
        <Closing/>
        <Sender/>
    </LetterTail>
</Letter>
```

The StartDate variable, which is defined in the LogicFile example above as a SimpleDate, is inserted into the document via an InsertUserText processing instruction.

The XML document example above also demonstrates how versioning is implemented in this alternative embodiment. There is a "version" attribute on the LogicSource element indicating that this document requires a particular version of the logic resource identified by the "uri" attribute. This method for identifying resources and versions of resources is consistent with the DeltaV standard for version control, as described at http://www.webdav.org/deltav/. The "version" attribute is also present on the SmartModule.

Versioning offers a number of advantages to the system, including the ability to incrementally change, rollback and record differences between versions of a document. When a new version is created, the author is prompted to supply information relating to the changes made. If a more recent version of a LogicSource or a Module is available, a user can update to the newer version of the resource (if compatible). Compatibility is determined by checking that all references in the document to the old version will be resolved by the new version. This creates the possibility for LogicSources and Modules to be maintained independently of documents that refer to them. Versioning avoids the possibility of logical inconsistencies. These can occur where a shared LogicSource is modified such that not all Variables can be resolved. Since a given document can only ever point to a particular version of a LogicSource or Module, this is never possible. Finally, versioning creates the option for 'publishing' a particular version of a document to users while the document continues to be developed. Some users may be restricted to only being able to access these 'published' or approved documents.

A standard XML editor designed purely for editing XML documents only needs to concern itself with the document grammar, the user interface, and the XML document. In contrast, the editor 112 of the document assembly system performs standard editing functions but also:

(i) defines and manipulates logic in logic sources 210 according to the logic grammar 214;

(ii) refers to and manipulates references to logic sources 210 within XML source documents 208. This involves recognising the Processing Instructions described above and handling them as if their PI data were 'real' XML elements in the XML source document 208. It also includes ensuring that all of the logical interactions between a logic source 210 and the XML source Document 208 are 'valid'. To do this, the editor 112 treats the source document 208 and the logic sources as if they were a single document, so that, for example, the IDREF in a Condition Processing Instruction to a Condition ID in a logic source can be validated; and (iii) presents a user interface to the user that allows an XML source document, logic source and logic references within an XML source document to be easily manipulated.

Figure 12:
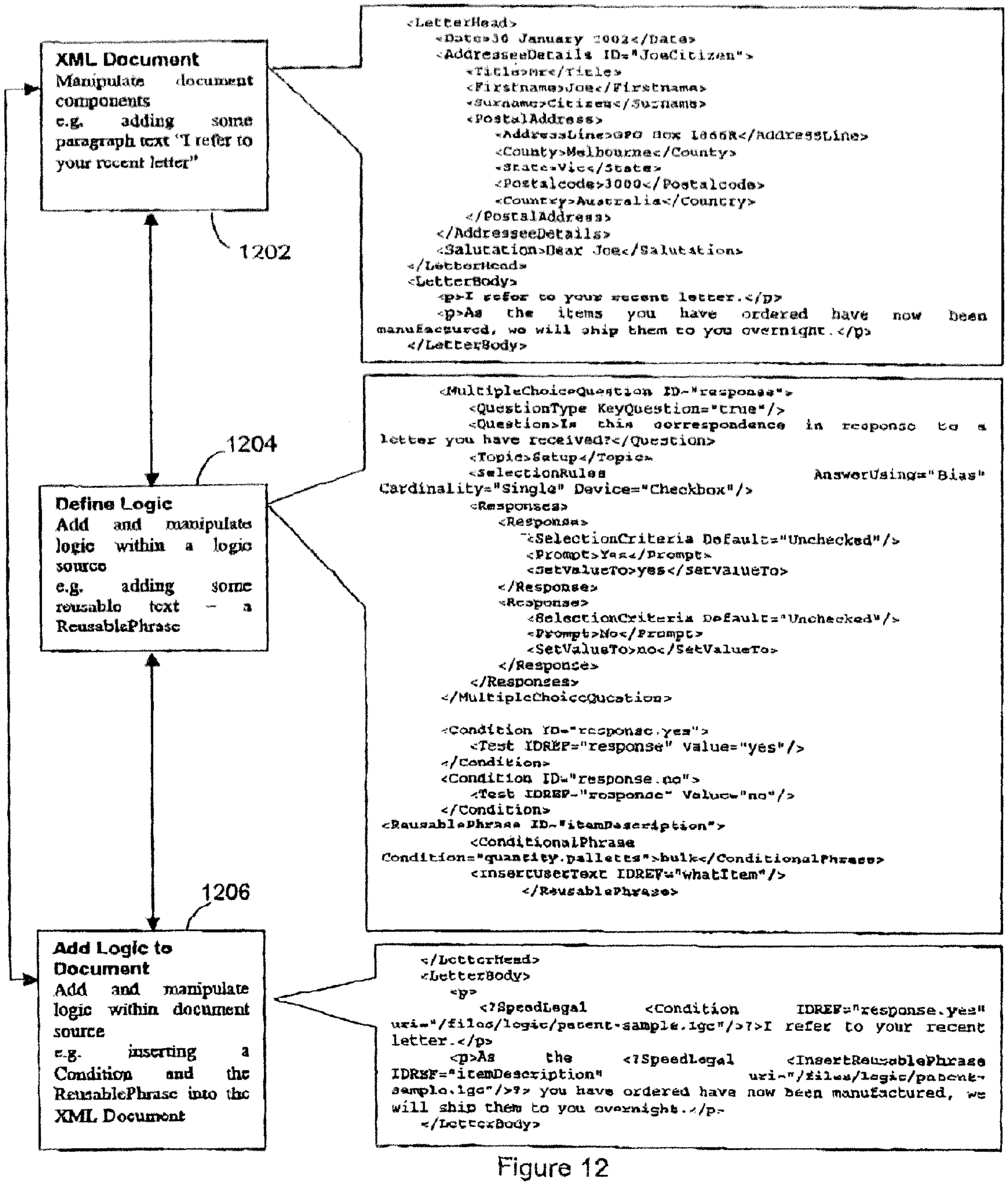
FIG. 12 is a schematic diagram illustrating the development of document assembly files using an editor of the document assembly system.

As shown in FIG. 12, the process of generating input files with the editor 112 of the document assembly system typically includes XML source document (without logic) creation and editing at step 1202, logic source content creation and editing at step 1204, and then creation and editing of logic references within the XML source document at step 1206.

Figure 13:
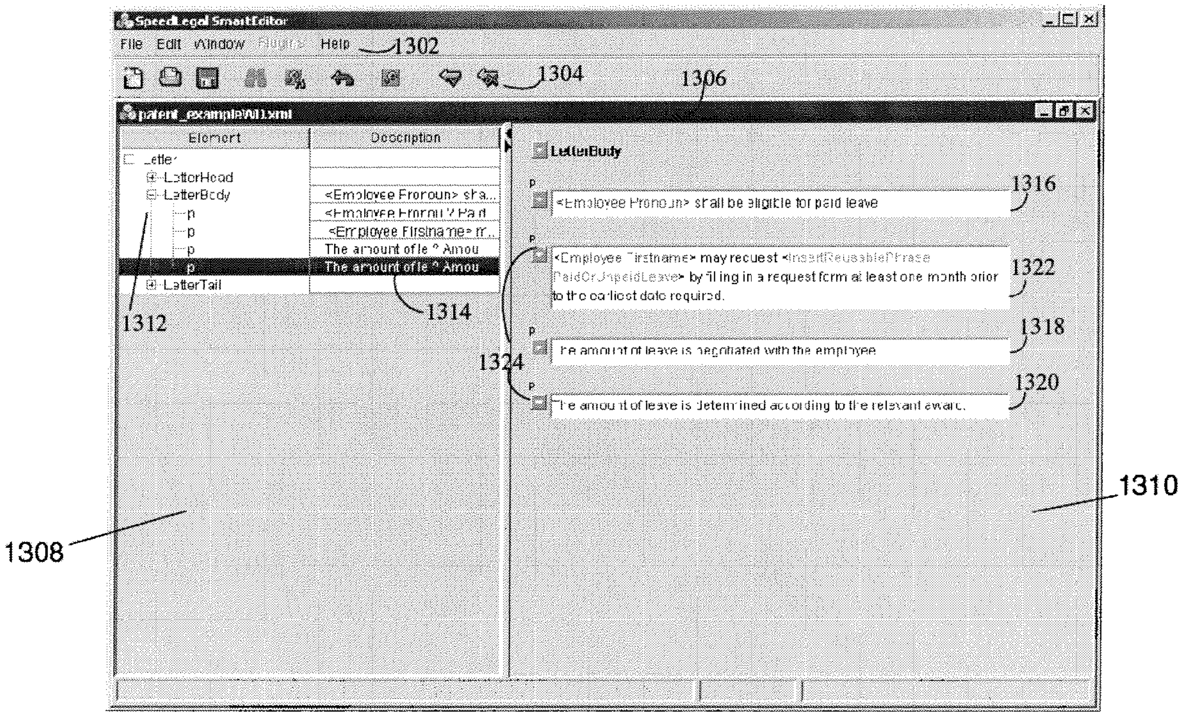
FIGS. 13 to 15 are screenshots of the editor during development of document assembly files.

FIG. 13 is a screenshot of a window display generated by the editor 112 during editing of a source XML document representing a letter. The window display includes a pull-down menu toolbar 1302, an icon toolbar 1304, and a document window 1306. The document window 1306 is vertically divided into a structure portion 1308 on the left and a detail portion 1310 on the right. The structure portion 1308 is itself vertically divided, with a hierarchical display 1312 of the XML elements of the document on the left, and an abbreviated description display 1314 of each element on the right. The detail display 1310 includes text boxes 1316 to 1322 for displaying and entering XML elements and textual content. Pull down menu buttons 1324 to the let of each text box 1316 to 1322 allow the insertion of XML elements and processing instructions. To insert elements or processing instructions within a body of text, the user can bring up a menu of allowable insertions by either using the mouse (right-clicking) or a key combination. This will insert the element or processing instruction within the text at the current position of the cursor. The presence of a condition processing instruction associated with the content of a text box is indicated by the presence of a red dot on the corresponding pull down menu icon 1324. An orange dot on the icon 1324 denotes a Note. Thus in FIG. 13 the first text box 1316, third text box 1318, and the fourth text box 1320 represent conditional text elements that may or may not be included in an instance document generated from this source document being edited depending upon the value of the condition associated with each text element. The second text box 1322 has a note that does not form part of the text of the instance document but is viewable in HTML and PDF renderings of the instant document, as a pop-up window, for example.

Figure 14:
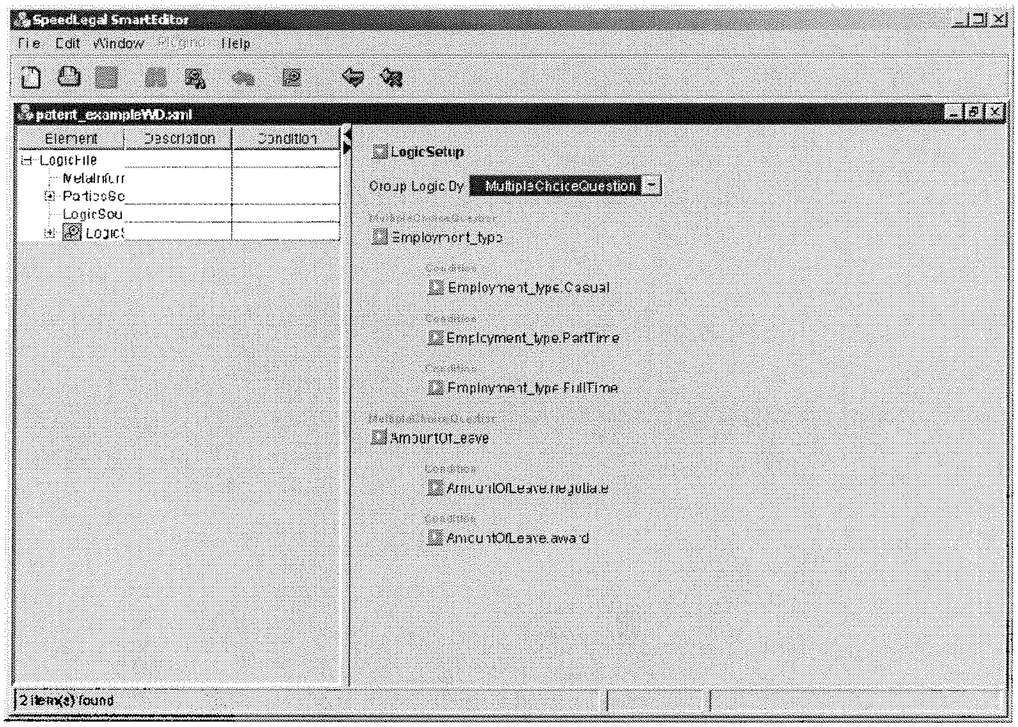

FIG. 14 is a screenshot of the editor 112 window display after definition of a multiple choice question. The variable associated with this question is named Employment_type, and three conditions, Employment_type.Casual. Employment_type.PartTime, and Employment_type.FullTime indicate whether an employee is employed on a casual, part-time, or full-time basis. A second multiple choice question, AmountOfLeave, is also shown, with associated conditions AmountOfLeave.negotiate and AmountOfLeave.award. These conditions can be used to select the appropriate text for inclusion in an instance document depending upon the values of these variables, which are determined by responses received from a user or some other data source, as described above.

Figure 15:
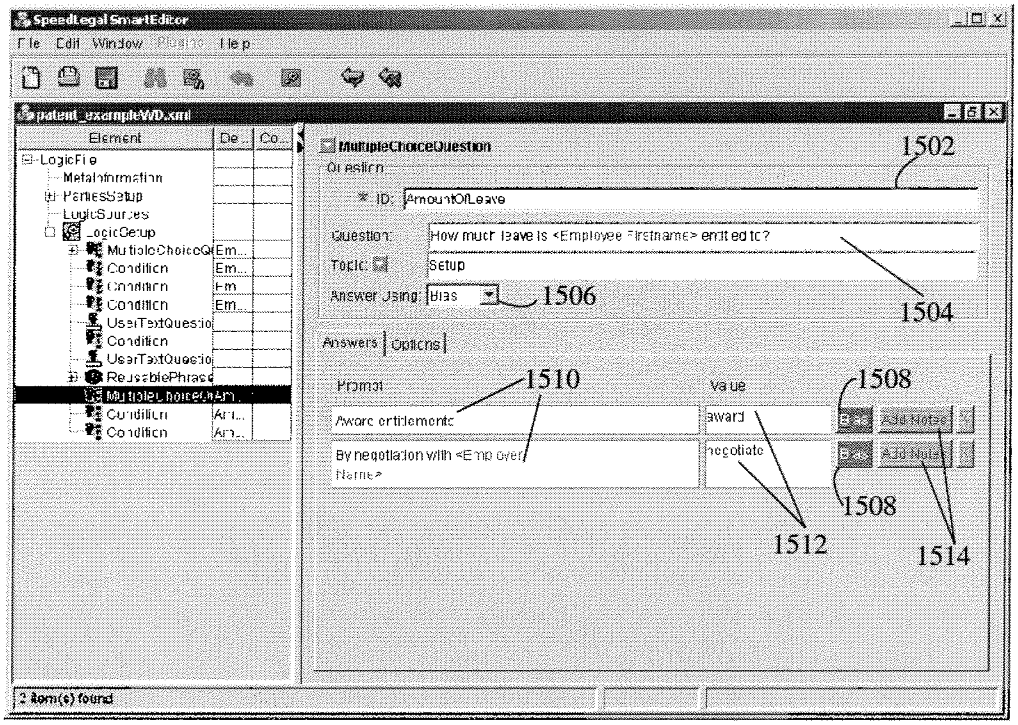

FIG. 15 shows a screenshot of the editor 112 window display during definition of the question associated with the AmountOfLeave variable described above. An ID text box 1502 allows the user to enter the ID name of the question, and a question text box 1504 is provided for the user to enter the actual text of the question that will be presented to the user. Note that, in this case, a party reference is included in the question text so that the employee's first name can be included in this text when it is displayed to an end-user. A pull down menu 1506 allows the user to specify whether the default answer to this question should be determined on the basis of a bias favoring a particular party, for example, employee or employer, or a predetermined default value. In this case, a bias has been selected, and consequently a bias button 1508 is displayed for each possible response to the question. A bias button 1508 is used to specify the degree to which the corresponding answer suits a particular party. If, during an interview round, an end-user specifies that the selected party is to be favoured, then the default answer to that question will be the one which best suits the selected party. This information, including bias and/or fixed default information, is included in the SelectionCriteria element associated with each response.

A prompt text box 1510 is provided for editing each possible response (as it will be presented to the user) to this multiple choice question. Value text boxes 1512 allow the user to enter a variable value associated with each response.

For example, if the award entitlements response was selected by a user, the MultipleChoiceQuestion or variable AmountOfLeave would have value "award", and the related conditions AmountOfLeave.award and AmountOfLeave.negotiate would have a values of true and false respectively. "Add notes" buttons 1514 are provided for each response, allowing the user to add note text which can be displayed during the corresponding interview to assist a user to select the appropriate response.

Within the editor 112, the user may also need to be able to reuse a chunk of XML with its associated logic. A reusable chunk of XML is referred to as a Module.

A Module comprises:

(i) the XML element or text the user has selected;

(ii) external-items (that is, items in the document but outside the text selected by the user that are referred to (generally by ID) by that text or by a reference from that reference and so on); and (iii) a LogicSources element declaring logic required by (i) and (ii).

To make a Module available for re-use, the editor 112;

(i) exports the element or text the user has selected;

(ii) identifies and possibly exports external-items, such that the entire module is able to be made valid once it has been imported into a target document; and (iii) identifies all logic that the module references and ensures that that logic is in the logic sources declared in the Module's LogicSources element.

There are two ways that a user may desire the module to be used. In the first, a copy of the module is imported into the document—this allows the author to modify the text and/or logic as the module now forms part of the target document. For a module copy, the editor 112:

(i) imports the text—ensuring that it is valid in the target document. This may mean altering identifiers to allow the import to occur;

(ii) imports or ensures that any external-items specified in the module are present in the target document. This may mean altering identifiers to allow the import to occur;

(iii) ensures the presence of (importing into a logic source used by the target document if necessary), all associated logic referred to by the text, external-items or from within the logic itself. This may mean altering identifiers to allow the import to occur; and (iv) maps any Party references (if possible) in the text, logic and external-items to those used in the target document.

Alternatively, the user can import into the document a link to the module—this can point to a current version of the module, and any modifications subsequently made to the module are automatically reflected in the resulting document. For a module link, the editor 112:

(i) creates a SmartModule processing instruction in the target document (which links the module to the target document)—ensuring that it would be valid if present in the target document. This can include providing a map of identifiers that need to change in order to allow the import to occur;

(ii) displays the module to the user so that the text can be viewed (but not edited) as if it were part of the target document;

(iii) ensures that any external-items required by the module are present in the target document (adding them if necessary);

(iv) adds logic sources required by the module to the target document LogicSources;

(v) provides party mapping (if possible) so that the module can be imported into the target document;

(vi) provides a means by which identifiers (declarations and references) in the module can be kept track of such that the target document cannot be invalidated when the module is imported into the target document by the Processing Engine 202. The editor 112 tracks all identifiers used in the XML document including linked Modules without having to import or fetch the Module every time. This is achieved by:

(a) keeping references to logic made from the linked Module;

(b) keeping references to links between Module elements and elements defined in the XML document; and (c) keeping references to declarations made within the linked Module.

In some circumstances, it may be desirable to ensure that an instance XML document can be generated which conforms to the same grammar as the source document, for example, if the XML instance document is to be used outside the document assembly system (for example, edited in a standard XML editor).

If it is possible to place conditions on any element in the source XML document, then there is no guarantee that the instance XML document will be valid.

As an example, suppose the DTD (xhtml-letter-v2) used for the letter document above specified that a <letter> must have one and only one <LetterHead> child. Then, if a user were able to place a condition on the LetterHead, and in processing the source document through the Processing Module 202 that condition evaluated to false, the <LetterHead> child would be omitted from the instance XML document, with the result that the instance XML document would be invalid.

XML grammars can express a variety of restrictions on the number of occurrences that are allowed for particular elements, for example zero or one, exactly once, and one or more times. If an instance document does not match a specified rule, it will be invalid.

To ensure that the instance XML document is valid, a condition PI can only be attached to an element if:

(i) the element is allowed zero or more times; or (ii) the element is allowed to occur zero or once; or (iii) the element is allowed to occur one or more times, and either: (a) one of the occurrences of the element docs not have a condition attached, or (b) one of the conditions is always true when the others are false.

In order to express more than one alternative for an element that is only allowed to occur zero or one times, one condition is applied to the element itself to determine whether the element appears at all in the instance XML document, and alternative condition PIs are applied to nodes inside the element (the same rules apply to the use of conditions on these nodes). If an element is to occur exactly once, and it is desired to allow several possibilities for its textual content, then conditional phrases are used inside the element—the editor 112 prevents a condition from being attached to the element itself.

Similarly, if an XML document contains an element with an ID, and another with an IDREF which points to it, then, if the element with the ID had a condition on it which evaluated to false, with the result that that element was not included in the instance XML document, and the element with the IDREF was included, the document would be invalid.

Accordingly, if the instance XML document is to be valid, then any element with an attribute of type IDREF is subject to conditions that include all the conditions to which the element with the corresponding ID is subject. Whenever the conditions to which an element with an ID is subject are altered, the editor 112 ensures that all elements with an IDREF pointing to it are subject to appropriate conditions.

After a source document 208 and its one or more logic sources 210 have been defined with the editor 112, they can be used by the processing engine 202 to generate one or more instance documents. The processing engine 202 begins processing an input XML document 208 when the Java controller servlet 218 creates an instance of the evaluator 402 in response to a request from the user's web browser. In the preferred embodiment, the constructor for the evaluator 402 takes the input XML document as a document object model (DOM) object, but it could alternatively be passed as text, or as a URI from which it can be retrieved.

Later, the Evaluator 402, in conjunction with the evaluable node package 404 and the parties package 406, identifies questions that need to be answered. In order for it to be able to suggest a default answer or answers for each question which would result in text intended to favour one party to the document over another (or to automatically answer a question that is not a KeyQuestion), the Java servlet 218 may specify to the Evaluator 402 which party to favour, as ascertained at step 504.

The Evaluator 402 constructs two objects it will need later: operativeConditions, and operativeInterviewItems. It also extracts the logic from each logic source referred to in the document's LogicSources element, and from each logic source referred to in the LogicSources elements in each logic source, and so on (being careful not to got into an infinite loop). However, in the preferred embodiment, the Evaluator 402 does not extract the logic from a logic source imported by an XML fragment until the SmartModule processing instruction is encountered later. When the logic import is performed, the Evaluator 402 determines how the parties in that logic source are mapped, relative to the main XML document (the party mapping chain). Each Condition and InterviewItem (e.g., MultipleChoiceQuestion and UserTextQuestion—there are no ArrayRowIterators in a logic source) is stored in a hash table keyed by the URI of its logic file combined with its party mapping chain and its own ID, so that discrete instances (as explained above) can be stored, and they can be retrieved efficiently.

Finally, the Evaluator 402 extracts Party declarations from these logic sources, creates a Party object to represent the Party declaration, and stores each Party object in the Parties object of the party package 406, keyed by the URI of its logic file combined with the ID of the Party. Each Party object has objects associated with it representing each PartyDetail, and each PartyDetail has a means of representing each Value in it. The Value element is stored in an object named PartyDetailValue.

The invoking process (the Java Controller Servlet 218) then calls evaluator initialisePartiesInUse ( ). The purpose of this method is firstly, to identify any UserTextQuestions in a Party XML object that will definitely need to be answered (i.e., irrespective of whether any conditions in the document evaluate to true or false), and secondly, to identify the Party XML objects for which the engine will need to know a gender and/or number. It is desirable to establish this up front, so that for an invoking process 412 which interacts with an end-user, the questions relating to the parties can be put to the user before the other questions. One of the benefits of doing this is that words in those other questions drat identify a party by using a PartyReference can be replaced with the value of that PartyReference.

The method evaluator.initialisePartiesInUse ( ) performs a breadth-first traversal of the DOM object. The breadth-first traversal is implemented recursively; recursion stops at any node that has a condition attached to it. Where in the course of performing the breadth-first traversal, a PartyReference PI is encountered, getValue is invoked on the appropriate PartyDetail. That method is as follows:

```
public String getValue ( Evaluator evaluator )
    throws SpeedLegalLogicException {
  if (value!=null) {
    return value;
  }
  boolean returnEarly = false;
  String number = party.getNumber ( ) ;
  String gender = party.getGender ( ) ;
  if ( gender==null ) {
    if ( needToKnowGender ( ) ) {
      // Ask the user the gender question
    party.askGender (evaluator) ;
      returnEarly = true;
    } else {
      // If we don't know it and don't need to know it,
      // because the only value provided is for
"unspecified"
      gender = "Unspecified";
    }
  }
  if ( number==null ) {
    if ( needToKnowNumber ( ) ) {
      // Ask the user the number question
    party.askNumber (evaluator) ;
      returnEarly = true;
    } else {
      number = "Unspecified";
    }
  }
  if (returnEarly) {
return null;
  }
  // If we get here, we're guaranteed some value for both
gender and number
  // Is there an exact match on gender and number?
  String key = PartyDetailValue.constructKey ( gender,
number) ;
  if ( values.get ( key ) !=null ) {
    value = ( (PartyDetailValue) values.get
( key ) ) .getValue ( evaluator ) ;
    return value;
  }
  // Failing that, fall back to partial matches in some
circumstances.
  //   Match on Gender first, but could do Number first
if we wanted..
  // GENDER
  // if we wanted to prohibit match on Unspecified number
whenever there
  // was a value for either but not both Singular and
plural, we'd
  // have if !needToKnowNumber ( ) here . . .
    key = PartyDetailValue.constructKey ( gender,
"Unspecified") ;
    if ( values.get ( key ) !=null ) {
      value = ( (PartyDetailValue) values.get
( key ) ) .getValue ( evaluator ) ;
      return value;
    }
  // NUMBER
  //if ( !needToKnowGender ( ) ) { - see comments on Gender
above
    key = PartyDetailValue.constructKey ( "Unspecified",
number) ;
    if ( values.get( key ) !=null ) {
      log.debug("Partial match on number.") ;
      value = ( (PartyDetailValue) values.get
( key ) ) .getValue ( evaluator ) ;
      return value;
    }
  // What about a match on completely unspecified?
  //if ( !needToKnowNumber ( ) && !needToKnowGender ( ) ) {
    log.debug ("Trying to match unspecified number and
gender.") ;
    key = PartyDetailValue.constructKey ( "Unspecified",
```

-continued

```
        "Unspecified") ;
            if ( values.get ( key ) !=null ) {
                log.debug ("Match on default only..") ;
                value = ( (PartyDetailValue) values.get
        ( key ) ) .getValue ( evaluator ) ;
                return value;
            }
        // We could get here if the document author didn't provide
        Unspecified number
        // and Unspecified gender, but only, say Female Singular,
        // and the end user chose say Male Singular,
        log.error ("No match, not even on Unspecified.") ;
        value = "[* No match for party: " + party.getKey ( ) + " ,
        detail: " + id
                + " , of gender ' " + gender + " ' and number ' "
            + number + " '. Document author must fix this. *]" ;
        return value;
```

Where necessary, by invoking other methods, get Value causes InterviewItems to be created which represent the questions that need to be answered. The questions are either MultipleChoiceQuestions that seek to establish the Gender (Male, Female or Neuter) or Number (Singular or Plural) of a Party, or UserTextQuestions that prompt for text forming part of the value of the PartyDetail for the matching Gender and Number (where 'matching' is determined by the procedure implemented by the getValue method).

When the Evaluator 402 has finished doing this, the invoking process 412 cheeks to see whether there are any InterviewItems that need to be resolved. If there are no InterviewItems that need to be resolved, Evaluator.evaluate( ) is invoked. It extracts any InterviewItems from the document which need to be resolved at this point. Its function is described in detail below.

If there are still no interview items that need to be resolved, then the input document is a trivial case, and the instance XML document would be identical. Otherwise, the invoking process 412 resolves the interview items.

The Java controller servlet 218 creates an HTML form for a user to complete in their web browser. However, it will be apparent that the controller servlet 218 could alternatively seek responses from some other source, for example, a database which it queries using SQL, a web service, or some application using its API. As described above, a logic source can specify a preferred method for resolving either all interview items, or some particular interview item, together with the details required in order to do so (e.g., URL, authentication information, query etc) which the invoking process 412 attempts to honour. The invoking process 412 returns a response for each interview item, even if it couldn't get a response using the preferred method.

Having resolved the interview items, the invoking process 412 calls Evaluator 402's evaluate ( ) method, passing it a set of interview items that contain values evaluate ( ) first transfers the answers from the interview items proffered by the invoking process 412 to any matching interview items for which it was awaiting responses. Because there is a flag on each PartyDetail and each Condition object which ensures that the Evaluator 402 only attempts to evaluate it once each time the invoking process 412 calls Evaluator 402's evaluate ( ) method (hereinafter called "interview round"), these flags are reset.

As described above, the Evaluator 402 performs a recursive breadth-first traversal of the DOM object. During the course of the breadth-first traversal, certain nodes will be encountered that require special handling. In this embodiment, these nodes are all processing instructions so that they can be included in an XML document without affecting its validity.

PartyReference processing instructions are treated as described above. It is possible for the Evaluator 402 to encounter a PartyReference to a PartyDetail not previously encountered (because it occurs below an element to which a condition is attached). As before, getValue is invoked on the appropriate PartyDetail.

It will be apparent that in embodiments of the present invention, any node could be given special handling—either by node name, or node type, in either all documents or only documents using a specified XML schema or DTD, or indeed by position in the document. In the preferred embodiment, the traversal method calls an empty method which can be overridden in a subclass of Evaluator to implement this special handling if desired.

When a node that has a condition processing instruction is encountered, the Evaluator 402 attempts to evaluate it. First, it looks to see whether that condition has been encountered already (if it has, an object representing it will be stored in the operativeConditions object). If the condition has not been encountered already, an object that represents it will be constructed and stored in the operativeConditions object. Then, if the condition is not fully evaluated, and if the relevant flag indicates that no attempt has been made to evaluate the condition in this interview round, the Evaluator 402 attempts to evaluate the Condition.

The Condition is evaluated as follows. Each of the elements that can appear in a Condition—the operators And, Or, Not, Test, UseCondition, and the values True and False—implements an interface that defines a method named evaluate( ) (not to be contused with Evaluator 402 or its evaluate( ) method), and has a constructor with the same signature. Because of this, in this embodiment, the Condition object can use a Java programming technique known as reflection to construct objects representing its children, and call their evaluate( ) method. In rum, if a child of an object is And, Or, Not, Test, or UseCondition, the objects can recursively construct and call evaluate( ) on an object representing that child, so that ultimately, each of And, Or, and Not, has arguments that are boolean values that can be evaluated to true or false using classical boolean logic. Finally, Condition(True) evaluates to True, and Condition(False) evaluates to False.

If a Test node is encountered, then when its evaluate( ) method is invoked, the Test object checks to see whether the MultipleChoiceQuestion it refers to has been instantiated as an object (It will have been if some other Test node which refers to the same MultipleChoiceQuestion has already been processed). If the MultipleChoiceQuestion has not been instantiated, a MultipleChoiceQuestion object representing it is constructed.

If the invoking process 412 has indicated that only Key Questions should be asked, and this question is not a Key question, then the processing engine 202 can evaluate it automatically using the scoring procedure based around the SelectionRules and SelectionCriteria for that MultipleChoiceQuestion (in this embodiment, a method in the object representing the MultipleChoiceQuestion in the interview item package 408 does this). Where a new MultipleChoiceQuestion has been constructed, it will be added to operativeInterviewItems. Each InterviewItem (a MultipleChoiceQuestion is a type of InterviewItem) in operativeInterviewItems has status either "pending" or "known".

If a MultipleChoiceQuestion has status pending, then the Evaluator 402 waits for the invoking process 412 to provide it with a response value before it evaluates the Test that uses it to true or false. InterviewItems with status pending are not returned to the invoking process 412 an they are created, but rather, are only returned when the traversal has been completed. This makes it easy for an invoking process 412 that interacts with a user to put several questions to the user at once, perhaps organised by the value of the MultipleChoiceQuestion's Topic child.

If the MultipleChoiceQuestion has status known, then Test's Evaluate method will return true if the MultipleChoiceQuestion has a response equal to the value specified in the Test, and false otherwise.

If the condition evaluates to true, then the traversal can descend into the node to which the condition applies. If it evaluates to false, that node will not be included in the instance XML document (To assist the rendering engine 204 later on, the evaluate method of the Evaluator 402 adds an attribute named "diedInEvaluation" to an element that had a condition which evaluated to false.). If the condition cannot be evaluated to either true or false, the traversal does not in this interview round descend into the node to which the condition applies. Instead, any pending interview items (created as described above) will in due course be returned to the invoking process 412 for resolution, so that, assuming responses are provided, the condition may be evaluated in the next interview round.

When an InsertReuseablePhrase processing instruction is encountered, the Evaluator 402 retrieves the ReusablePhrase node it refers to from the relevant logic source, and physically replaces the processing instruction node in the DOM object with that ReusablePhrase node. It then puts an IDREF to that logic source on relevant descendants of the ReusablePhrase node, and converts any logic elements in those descendants from the XML format used in the logic file to the Processing Instruction format appropriate to the XML source document. It is then possible to traverse the descendants of the ReuseablePhrase node in the usual way, albeit in a context provided by the party mapping chain for the logic source it came from (so Conditions and InterviewItems can be looked up correctly).

A consequence of this way of processing an InsertReuseablePhrase processing instruction is that a single ReusablePhrase node is inserted into the document and traversed multiple times if there is more than one InsertReusablePhrase processing instruction that points to it. In an alternative embodiment, each ReusablePhrase node could be traversed just once, and the result inserted into the document at a later step.

When an InsertUserText processing instruction is encountered, the Evaluator 402 determines whether a UserTextQuestion object representing the UserTextQuestion the processing instruction points to already exists in operativeInterviewItems. If it does not, the Evaluator 402 creates a new UserTextQuestion object, and adds it to operativeInterviewItems with status "pending".

When an ArrayRowIterator element is encountered, the processing engine 202 first checks to see whether its "repeat" attribute has a known positive integer value. If it does not, then the ArrayRowIterator cannot be processed any further until the InterviewItem named in that attribute has a value (it Is an error if that value is not a positive integer). Once the "repeat" attribute has a known positive integer value, a two-dimensional array of InterviewItems is created. The first dimension is the InterviewItems identified in the ArrayReference processing instruction descendants of the parent of the ArrayRowIterator; the second dimension is the number of rows specified by the "repeat" attribute. The ArrayRowIterator object containing that two-dimensional array of interview items is added to OperativeInterviewItems, and resolved in the usual way.

A situation can arise whereby two ArrayRowIterator processing instructions contain ArrayReference processing instructions pointing to the same interview item. For example, suppose a first ArrayRowIterator has a repeat attribute value of n1, and the second n2. In the preferred embodiment, the Interview Items in the abs(n2−n1) rows common to both ArrayRowIterators are then asked only once. However, alternative embodiments could require independent values for the InterviewItems in those rows.

When the breadth-first traversal is complete, the evaluate method of the Evaluator 402 returns control to the invoking process 412. The invoking process 412 then asks the Evaluator 402 for all operativeInterviewItems that have status pending. If there are none, then the document has been fully evaluated, and an instance document is created by the Rendering Engine 204. If there are operativeInterviewItems with status pending, the invoking process 412 determines a response value for each of those interview items, as described above following evaluator.initialisePartiesInUse ( ).

Having resolved the interview items, the invoking process 412 calls evaluate method of Evaluator 402, passing it a set of interview items which contain values. This cycle repeats, until such time as there are no pending interview items.

When there are no pending interview items, an instance document in XML, PDF, RTF, HTML, or some other format, can be created from the DOM document object which the processing engine 202 has been manipulating.

As the rendering engine 204 creates an instance document, elements of the source XML document with conditions that evaluated to false (and therefore had an attribute named "diedInEvaluation") are omitted, each InsertUserText processing instructions is replaced by the value of the corresponding UserTextQuestion, the ReusablePhrases have replaced the InsertReusablePhrase processing instructions, and so on. This is done using XSLT with Xalan extension functions, which get the values of UserTextQuestions and PartyReferences from the evaluator 402. In alternative embodiments, an extension function could look up the value of the condition, instead of relying on the presence or absence of the diedInEvaluation attribute. An alternative to using XSLT for most of the rendering engine's work would be to pro grammatically do another recursive traversal.

Of particular interest is the generation of an instance document into HTML format. The instance document can be rendered in such a way that any text that appears as a result of one or more conditions evaluating to true, or as a result of a response to a UserTextQuestion, is generated by the rendering engine 204 as a hypertext anchor. When that anchor is activated, the user interface displays the question and response that resulted in the anchor text being included, as described above. In the case of text that is subject to one or more conditions, it would be possible to display the questions associated with each condition. However, in the preferred embodiment, only the questions associated with the closest ancestor having a condition processing instruction are displayed.

When the anchor is activated, it is also possible to reset one or more of the questions associated with the condition (which means the condition should be re-evaluated, so that the question is asked again), or, in the case of a UserTextQuestion, to ask it again. Where a question associated with a condition is reset, any other condition which used that MultipleChoiceQuestion is also reset, as is any other condition which used that condition, and so on.

In the user interface available to a user of the document assembly system via their web-browser, when a user moves their mouse over the relevant text, JavaScript and the anchor element's HTML onMouseOver event is used to generate a pop-up window displaying the relevant questions and responses, as shown in FIG. 7; when a user clicks on the anchor, the Processing Engine 202 is invoked to reset the relevant questions.

The HTML rendering of the document also typically provides a list of all the questions that were answered, together with the user's responses. If the user selects a question link, the Processing Engine 202 resets that question as described above.

Many modifications will be apparent to those skilled in the art without departing from the scope of the present invention as herein described with reference to the accompanying drawings.

The invention claimed is:

1. A non-transitory computer-readable storage medium having executable instructions stored thereon that, when executed by at least one processor of a computer system, cause the at least one processor to perform a set of operations, comprising:

associating document assembly instructions with selected locations within at least one initial XML document to generate at least one XML source document, the document assembly instructions being instructions to be executed by at least one processor of a computer system to determine content at corresponding locations of at least one instance document to be generated from said at least one initial XML document;

wherein:

(i) said at least one initial XML document is valid with respect to a predetermined DTD or schema that does not include said document assembly instructions;

(ii) the at least one XML source document is valid with respect to the same predetermined DTD or schema as said at least one initial XML document;

(iii) the associating of at least one of said document assembly instructions with one or more of said locations within said at least one initial XML document associates said at least one document assembly instruction with one or more selected portions of said at least one XML source document; and (iv) one or more of the document assembly instructions associated with selected portions of said at least one XML source document define one or more conditions that determine whether the one or more corresponding selected portions of said at least one XML source document will be included in said at least one instance document; and storing the at least one XML source document on at least one of said non-transitory computer-readable storage medium and a second non-transitory computer-readable storage medium.

2. The non-transitory computer-readable storage medium as claimed in claim 1, wherein at least one of said document assembly instructions includes one or more references to one or more other document assembly instructions.

3. The non-transitory computer-readable storage medium as claimed in claim 1, wherein said at least one XML source document includes one or more references to document assembly instructions external to said at least one XML source document.

4. The non-transitory computer-readable storage medium as claimed in claim 3, wherein at least one of said one or more references to document assembly instructions includes information that allows one or more of said document assembly instructions to be retrieved from a database.

5. The non-transitory computer-readable storage medium as claimed in claim 1, wherein said at least one XML source document includes said document assembly instructions.

6. The non-transitory computer-readable storage medium as claimed in claim 1, wherein said at least one XML source document includes XML Processing Instructions that include or reference said document assembly instructions.

7. The non-transitory computer-readable storage medium as claimed in claim 1, wherein one or more of said document assembly instructions determine one or more queries, conditions, and/or reusable content for use in determining said content of said at least one instance document.

8. The non-transitory computer-readable storage medium as claimed in claim 1, wherein said at least one XML source document includes one or more references to one or more queries, conditions, and/or reusable content for use in determining said content of said at least one instance document.

9. The non-transitory computer-readable storage medium as claimed in claim 8, wherein the one or more referenced entities are external to said at least one XML source document.

10. The non-transitory computer-readable storage medium as claimed in claim 8, wherein said at least one XML source document includes one or more references to one or more documents defining said one or more queries, conditions, and/or reusable content.

11. The non-transitory computer-readable storage medium as claimed in claim 10, wherein at least one of said one or more documents is stored in a database, and said one or more references include information that allows said at least one document to be retrieved from said database.

12. The non-transitory computer-readable storage medium as claimed in claim 10, wherein said one or more references to said one or more documents are in the form of universal resource indicators.

13. The non-transitory computer-readable storage medium as claimed in claim 10, wherein said one or more documents are XML documents.

14. The non-transitory computer-readable storage medium as claimed in claim 13, wherein said XML documents are valid with respect to a DTD or schema.

15. The non-transitory computer-readable storage medium as claimed in claim 14, wherein the set of operations are configured to edit said one or more XML documents defining said one or more queries, conditions, and/or reusable content whilst maintaining the validity of said XML documents with respect to said DID or schema.

16. The non-transitory computer-readable storage medium as claimed in claim 1, wherein at least one of said one or more portions of said at least one XML source document includes one or more XML nodes in said XML source document, and a corresponding condition determines whether said one or more XML nodes will be included in said at least one instance document.

17. The non-transitory computer-readable storage medium as claimed in claim 8, wherein said one or more queries, conditions, and/or reusable content include interview data defining one or more questions for a user, and constraining responses to said questions.

18. The non-transitory computer-readable storage medium as claimed in claim 1, wherein said document assembly instructions include application data that can be parsed as XML.

19. The non-transitory computer-readable storage medium as claimed in claim 1, wherein said document assembly instructions include party instructions referring to attributes of a party defined in one or more of said documents.

20. The non-transitory computer-readable storage medium as claimed in claim 1, including a validation module configured to determine whether said at least one initial XML document or said at least one XML source document is valid with respect to a corresponding DTD or schema.

21. The non-transitory computer-readable storage medium as claimed in claim 1, wherein the set of operations are configured to insert at least one of:

(i) one or more document assembly instructions, and (ii) one or more references to document assembly instructions within said at least one initial XML document such that said at least one initial XML document remains valid with respect to said predetermined DTD or schema that does not include said one or more document assembly instructions.

22. The non-transitory computer-readable storage medium as claimed in claim 21, wherein the set of operations maintains validity with respect to said predetermined DTD or schema by inserting said at least one of:

(i) one or more document assembly instructions, and (ii) one or more references to document assembly instructions within XML Processing Instructions in said at least one initial XML document.

* * * * *